US008081155B2

(12) United States Patent
Kajino

(10) Patent No.: US 8,081,155 B2
(45) Date of Patent: Dec. 20, 2011

(54) ELECTROPHORETIC DISPLAY DEVICE DRIVING METHOD, ELECTROPHORETIC DISPLAY DEVICE, AND ELECTRONIC APPARATUS

(75) Inventor: Kiichi Kajino, Suwa (JP)

(73) Assignee: Seiko Epson Corporation (JP)

( * ) Notice: Subject to any disclaimer, the term of this patent is extended or adjusted under 35 U.S.C. 154(b) by 486 days.

(21) Appl. No.: 12/367,669

(22) Filed: Feb. 9, 2009

(65) Prior Publication Data

US 2009/0237392 A1 Sep. 24, 2009

(30) Foreign Application Priority Data

Mar. 24, 2008 (JP) ................................. 2008-075621
Oct. 14, 2008 (JP) ................................. 2008-265421

(51) Int. Cl.
*G09G 3/34* (2006.01)
*G02B 26/00* (2006.01)

(52) U.S. Cl. ......................... 345/107; 345/108; 359/296

(58) Field of Classification Search .................. 345/107, 345/108, 204, 690
See application file for complete search history.

(56) References Cited

U.S. PATENT DOCUMENTS 6,987,503 B2 * 1/2006 Inoue ............................ 345/107
7,812,812 B2 * 10/2010 Yoshinaga et al. ............ 345/107
7,859,527 B2 * 12/2010 Hirota et al. .................. 345/208

FOREIGN PATENT DOCUMENTS

EP 1 020 840 7/2000
EP 1 111 577 6/2001
JP 2003-084314 3/2003
WO 95-10107 4/1995
WO 2005-031690 4/2005
WO 2005-055187 6/2005

* cited by examiner

*Primary Examiner* — Duc Dinh

(74) *Attorney, Agent, or Firm* — Harness, Dickey & Pierce, P.L.C.

(57) ABSTRACT

A method for driving an electrophoretic display device includes: during a first partial rewriting period, partially rewriting the displayed image by supplying a common voltage to a common electrode, supplying a second voltage corresponding to a second gradation to each first pixel displaying a first gradation before rewriting and displaying the second gradation after rewriting, and supplying a voltage equal to the common voltage to each other pixel or putting each other pixel into a high impedance state; and during a second partial rewriting period, partially rewriting the image by supplying the common voltage to the common electrode, supplying a first voltage corresponding to the first gradation to each second pixel displaying the second gradation before the rewriting and displaying the first gradation after rewriting, and supplying a voltage equal to the common voltage to each other pixel or by putting each other pixel into a high impedance state.

6 Claims, 15 Drawing Sheets

| | |
|---|---|
| WHITE → WHITE (Rww)<br>S1 (Vcom) | WHITE → BLACK (Rwb)<br>S1 (Vcom) |
| BLACK → BLACK (Rbb)<br>S1 (Vcom) | BLACK → WHITE (Rbw)<br>S2 (LO) |

| | |
|---|---|
| WHITE → WHITE (Rww) S1 (Vcom) | WHITE → BLACK (Rwb) S2 (HI) |
| BLACK → BLACK (Rbb) S1 (Vcom) | BLACK → WHITE (Rbw) S1 (Vcom) |

FIG. 16

| | |
|---|---|
| WHITE → WHITE (Rww)<br>S1 (Vcom) | WHITE → BLACK (Rwb)<br>S1 (Vcom) |
| BLACK → BLACK (Rbb)<br>S2 (LO) | BLACK → WHITE (Rbw)<br>S2 (LO) |

FIG. 17

| | |
|---|---|
| WHITE → WHITE (Rww)<br>S1 (Vcom) | WHITE → BLACK (Rwb)<br>S2 (HI) |
| BLACK → BLACK (Rbb)<br>S2 (HI) | BLACK → WHITE (Rbw)<br>S1 (Vcom) |

ELECTROPHORETIC DISPLAY DEVICE DRIVING METHOD, ELECTROPHORETIC DISPLAY DEVICE, AND ELECTRONIC APPARATUS

BACKGROUND

1. Technical Field

The present invention relates to a method for driving an electrophoretic display device. In addition, the invention relates to an electrophoretic display device that is driven by the driving method. The invention further relates to an electronic apparatus that is provided with an electrophoretic display device that is driven by the driving method.

2. Related Art

An electrophoretic display device has an image display unit, which is an image display area made up of a plurality of pixels. Having the plurality of pixels, a typical electrophoretic display device of related art performs image display as follows. In each of the plurality of pixels, an image signal is written into a memory circuit through a pixel-switching element. A pixel electrode is driven as a result of the application of a pixel voltage thereto, the level of which is in accordance with the written image signal. As the pixel electrode is driven, an electric potential difference arises between the pixel electrode and the common electrode. An electrophoretic display element that is sandwiched between the pixel electrode and the common electrode is driven because of the voltage level difference that has arisen between the pixel electrode and the common electrode. In this way, an electrophoretic display device of the related art performs image display. As an example of such an image display apparatus of the related art, JP-A-2003-84314 discloses an electrophoretic display device that has a plurality of pixels in each of which a dynamic random access memory (DRAM) is provided as a memory circuit.

In a typical electrophoretic display technique of the related art explained above, the rewriting of an original image is performed by making the electric potential of the pixel electrode different from that of the common electrode in each of the plurality of pixels. That is, a voltage level difference arises between the pixel electrode and the common electrode in all pixels for each time when an image display switchover occurs. This means that the entire image changes over due to the application of voltages to the pixel electrodes and the common electrode in all of the plurality of pixels even when it is only a part of the image that needs to be actually changed. For this reason, a driving scheme of the related art has a technical disadvantage in that it inevitably results in high power consumption. In addition, it has another technical disadvantage in that the degradation of the electrophoretic display element is accelerated. Moreover, it has still another technical disadvantage in that it invites the degradation of image quality due to the successive writing of the same gradation (e.g., gray scale) into a pixel.

SUMMARY

An advantage of some aspects of the invention is to provide a method for driving an electrophoretic display device that makes it possible to display an image with high quality while reducing power consumption and reducing degradation. In addition, the invention provides, as an advantage of some aspects thereof, an electrophoretic display device that is driven by the driving method and an electronic apparatus that is provided with an electrophoretic display device that is driven by the driving method. Another advantage of some aspects of the invention is to provide a method for driving an electrophoretic display device that makes it possible to reduce image quality degradation at the time of image writing, an electrophoretic display device that is driven by the driving method, and an electronic apparatus that is provided with an electrophoretic display device that is driven by the driving method.

In order to address the above-identified problems without any limitation thereto, the invention provides, as a first aspect thereof, a method for driving an electrophoretic display device that is provided with a display unit having a plurality of pixels in each of which an electrophoretic element containing a plurality of electrophoretic particles is sandwiched between a pixel electrode and a common electrode that face each other, the driving method including: a first partial rewriting step of, when an image that is displayed on the display unit is rewritten, partially rewriting the image that is displayed on the display unit by supplying a common voltage to the common electrode, by supplying a second voltage to the pixel electrode of each of first pixels among the above-mentioned plurality of pixels, the above-mentioned each of the first pixels displaying a first gradation before the rewriting of the image and then displaying a second gradation that is different from the first gradation after the rewriting of the image, the second voltage being set so as to correspond to the second gradation, and by supplying a voltage that is the same as the common voltage to the pixel electrode of each of pixels other than the first pixels among the above-mentioned plurality of pixels or by putting the pixel electrode of each of pixels other than the first pixels among the above-mentioned plurality of pixels into a high impedance state; and a second partial rewriting step of, when the image that is displayed on the display unit is rewritten, partially rewriting the image that is displayed on the display unit by supplying the common voltage to the common electrode, by supplying a first voltage to the pixel electrode of each of second pixels among the above-mentioned plurality of pixels, the above-mentioned each of the second pixels displaying the second gradation before the rewriting of the image and then displaying the first gradation after the rewriting of the image, the first voltage being set so as to correspond to the first gradation, and by supplying a voltage that is the same as the common voltage to the pixel electrode of each of pixels other than the second pixels among the above-mentioned plurality of pixels or by putting the pixel electrode of each of pixels other than the second pixels among the above-mentioned plurality of pixels into a high impedance state.

In the operation of an electrophoretic display device that is driven by the driving method according to the first aspect of the invention described above, a voltage that is attributable to a difference between the electric potential of the pixel electrode and the electric potential of the common electrode in each of the plurality of pixels included in the image display area is applied to the electrophoretic display element. As a result of the application of the voltage thereto, electrophoretic particles that are contained in the electrophoretic display element that is provided between the pixel electrode and the common electrode migrates, that is, moves therein. In this way, an electrophoretic display device that is driven by the driving method according to the first aspect of the invention described above displays an image on the image display unit thereof. Note that the term "voltage" used herein encompasses the meaning of "electric potential" in the foregoing and following description of this specification. In addition, the term "gradation" used herein encompasses the meaning of "gray scale" in the foregoing and following description of this specification. For example, an image signal is written into a memory circuit through a pixel-switching element in each pixel prior to the execution of image-display operation. In response to the output of the memory circuit that is based on the image signal, a switching circuit performs switching control on the pixel electrode so as to supply a predetermined pixel voltage thereto. In this way, an electrophoretic display device that is driven by the driving method according to the first aspect of the invention described above performs image display.

In the method for driving an electrophoretic display device according to the first aspect of the invention described above, a common voltage is supplied to the common electrode in a first partial rewriting step when an image that is displayed on the display unit is rewritten. In addition, a second voltage is supplied to the pixel electrode of each of first pixels among the above-mentioned plurality of pixels. The above-mentioned each of the first pixels displays a first gradation (e.g., first gray scale) before the rewriting of the image and then displays a second gradation that is different from the first gradation after the rewriting of the image. The second voltage is set so as to correspond to the second gradation. A voltage that is the same as the common voltage is supplied to the pixel electrode of each of pixels other than the first pixels among the above-mentioned plurality of pixels.

In addition, in the method for driving an electrophoretic display device according to the first aspect of the invention described above, a common voltage is supplied to the common electrode in a second partial rewriting step when the image that is displayed on the display unit is rewritten as done in the first partial rewriting step. In addition, a first voltage is supplied to the pixel electrode of each of second pixels among the above-mentioned plurality of pixels. The above-mentioned each of the second pixels displays the second gradation before the rewriting of the image and then displays the first gradation after the rewriting of the image. The first voltage is set so as to correspond to the first gradation. A voltage that is the same as the common voltage is supplied to the pixel electrode of each of pixels other than the second pixels among the above-mentioned plurality of pixels.

For example, it is assumed herein for the purpose of explanation only that the first gradation is white whereas the second gradation is black. In the first partial rewriting step, the second voltage, which is an electric potential that is used for black display, is supplied to the first pixels, which should be rewritten from white into black. As a result of the application of the second electric potential thereto, the gray scale of the first pixels is rewritten from white into black. On the other hand, a common electric potential, which is supplied to the common electrode, is applied to all pixels other than the first pixels. Therefore, no electric potential difference arises between the pixel electrode of each of the pixels other than the first pixels and the common electrode. Thus, a gray scale that is to be displayed thereat does not change.

Next, in the second partial rewriting step, the first voltage, which is an electric potential that is used for white display, is supplied to the second pixels, which should be rewritten from black into white. As a result of the application of the first electric potential thereto, the gray scale of the second pixels is rewritten from black into white. On the other hand, a common electric potential, which is supplied to the common electrode, is applied to all pixels other than the second pixels. Therefore, no electric potential difference arises between the pixel electrode of each of the pixels other than the second pixels and the common electrode. Thus, a gray scale that is to be displayed thereat does not change.

In the method for driving an electrophoretic display device according to the first aspect of the invention described above, the rewriting of an original display image is performed through the first partial rewriting step and the second partial rewriting step. Through these partial rewriting steps, it is possible to rewrite the gradation of each pixel into a desired target gradation. That is, it is possible perform the rewriting of the gradation of each of the first pixels, which should be rewritten from the first gradation into the second gradation, and the gradation of each of the second pixels, which should be rewritten from the second gradation into the first gradation. On the other hand, no electric potential difference arises between the pixel electrode and the common electrode in each of the plurality of pixels other than the first pixels and the second pixels mentioned above, that is, each pixel that should retain its original gray scale without any switchover. Therefore, there occurs no gradation change thereat. Thus, an original image that is displayed on the image display unit (e.g., display area) is rewritten into a desired image without failure.

In the foregoing summary explanation of the first aspect of the invention, it is explained that an electric potential that is the same as the common voltage is supplied to the pixel electrode provided in each of the pixels at which no gradation change should occur in the first partial rewriting step and the second partial rewriting step. However, the scope of this aspect of the invention is not limited to such a specific example. For example, they may be put into an electrically disconnected high impedance state. That is, the pixel electrode of each of pixels other than the first pixels among the above-mentioned plurality of pixels may be put into a high impedance state in the first partial rewriting step. The pixel electrode of each of pixels other than the second pixels among the above-mentioned plurality of pixels may be put into a high impedance state in the second partial rewriting step. Even with such modification, just in the same manner as done by supplying the same level of a voltage thereto as the common voltage mentioned above, it is possible to avoid any electric potential difference from arising between the pixel electrode and the common electrode in each of the plurality of pixels at which its original gradation should be retained. Thus, it is possible to retain its original gradation thereat.

In the method for driving an electrophoretic display device according to the first aspect of the invention described above, it should be particularly noted that image rewriting is performed only for pixels at which a gradation changeover should occur. That is, image rewriting is not performed for pixels at which their original gradation should be retained. This means that image-rewriting operation is performed in a partial manner. For this reason, it is not only possible to reduce power consumption but also possible to reduce degradation in an image display unit due to the occurrence of an electric potential difference between electrodes. Moreover, it is possible to avoid the occurrence of flicker due to rewriting performed at the pixels at which their original gradation should be retained. Furthermore, it is possible to avoid a decrease in contrast due to kickback. The kickback is an undesirable gradation change that occurs immediately after the stopping of the supply of a voltage.

Furthermore, if the method for driving an electrophoretic display device according to the first aspect of the invention described above is adopted, it is possible to prevent any undesirable gradation difference such as a gray scale difference from arising because of the successive writing of the same gray scale into a pixel. For example, the gray scale of a certain pixel in which black is successively written immediately after black display may differ from the gray scale of another pixel in which black is written immediately after white display. In this respect, since black is not successively written into any pixel whose preceding display gray scale is black, the method for driving an electrophoretic display device according to the first aspect of the invention described above ensures that a gray-scale difference that is attributable to the successive writing of the same gray scale explained above does not arise.

In addition, since image-rewriting operation is performed through the first partial rewriting step and the second partial rewriting step, it is possible to make the number of times of the writing of the first gradation equal to the number of times of the writing of the second gradation. Therefore, for example, it is possible to reduce degradation in the electrophoretic element. Notwithstanding the above, however, if it suffices to rewrite either one of the first gradation and the second gradation only, that is, not both, for the rewriting of an original image, either the first partial rewriting step or the second partial rewriting step may be omitted.

As explained briefly above, the method for driving an electrophoretic display device according to the first aspect of the invention described above achieves partial rewriting of a display image. By this means, it is possible to display an image with high quality while reducing power consumption and reducing degradation.

In order to address the above-identified problems without any limitation thereto, the invention provides, as a second aspect thereof, a method for driving an electrophoretic display device that is provided with a display unit having a plurality of pixels in each of which an electrophoretic element containing a plurality of electrophoretic particles is sandwiched between a pixel electrode and a common electrode that face each other, the driving method including: a first partial rewriting step of, when an image that is displayed in an area section that makes up a part of the display unit is rewritten, partially rewriting the image that is displayed in the area section by supplying a common voltage to the common electrode, by supplying a second voltage to the pixel electrode of each of first pixels among pixels located in the area section, the above-mentioned each of the first pixels displaying a first gradation before the rewriting of the image and then displaying a second gradation that is different from the first gradation after the rewriting of the image and to the pixel electrode of each of second pixels among the pixels located in the area section, the above-mentioned each of the second pixels displaying the second gradation before the rewriting of the image and then displaying the second gradation after the rewriting of the image, the second voltage being set so as to correspond to the second gradation, and by supplying a voltage that is the same as the common voltage to the pixel electrode of each of pixels other than the first pixels and the second pixels among the above-mentioned plurality of pixels or by putting the pixel electrode of each of pixels other than the first pixels and the second pixels among the above-mentioned plurality of pixels into a high impedance state; and a second partial rewriting step of, when the image that is displayed in the area section that makes up a part of the display unit is rewritten, partially rewriting the image that is displayed in the area section by supplying the common voltage to the common electrode, by supplying a first voltage to the pixel electrode of each of third pixels among the pixels located in the area section, the above-mentioned each of the third pixels displaying the second gradation before the rewriting of the image and then displaying the first gradation after the rewriting of the image and to the pixel electrode of each of fourth pixels among the pixels located in the area section, the above-mentioned each of the fourth pixels displaying the first gradation before the rewriting of the image and then displaying the first gradation after the rewriting of the image, the first voltage being set so as to correspond to the first gradation, and by supplying a voltage that is the same as the common voltage to the pixel electrode of each of pixels other than the third pixels and the fourth pixels among the above-mentioned plurality of pixels or by putting the pixel electrode of each of pixels other than the third pixels and the fourth pixels among the above-mentioned plurality of pixels into a high impedance state.

In the method for driving an electrophoretic display device according to the second aspect of the invention described above, a common voltage is supplied to the common electrode in a first partial rewriting step when an image that is displayed in an area section that makes up a part of the display unit is rewritten. In addition, a second voltage is supplied to the pixel electrode of each of first pixels among pixels located in the area section. The above-mentioned each of the first pixels displays a first gradation before the rewriting of the image and then displays a second gradation that is different from the first gradation after the rewriting of the image. The second voltage is further supplied to the pixel electrode of each of second pixels among the pixels located in the area section. The above-mentioned each of the second pixels displays the second gradation before the rewriting of the image and then displays the second gradation after the rewriting of the image. The second voltage is set so as to correspond to the second gradation. A voltage that is the same as the common voltage is supplied to the pixel electrode of each of pixels other than the first pixels and the second pixels among the above-mentioned plurality of pixels.

In addition, in the method for driving an electrophoretic display device according to the second aspect of the invention described above, a common voltage is supplied to the common electrode in a second partial rewriting step when the image that is displayed on the display unit is rewritten as done in the first partial rewriting step. In addition, a first voltage is supplied to the pixel electrode of each of third pixels among the pixels located in the area section. The above-mentioned each of the third pixels displays the second gradation before the rewriting of the image and then displays the first gradation after the rewriting of the image. The first voltage is further supplied to the pixel electrode of each of fourth pixels among the pixels located in the area section. The above-mentioned each of the fourth pixels displays the first gradation before the rewriting of the image and then displays the first gradation after the rewriting of the image. The first voltage is set so as to correspond to the first gradation. A voltage that is the same as the common voltage is supplied to the pixel electrode of each of pixels other than the third pixels and the fourth pixels among the above-mentioned plurality of pixels.

For example, it is assumed herein for the purpose of explanation only that the first gradation is white whereas the second gradation is black. In the first partial rewriting step, the second voltage, which is an electric potential that is used for black display, is supplied to the first pixels located in the area section, which should be rewritten from white into black, and to the second pixels located in the area section, which should be rewritten from black into black. As a result of the application of the second electric potential thereto, the gray scale of the first pixels and the gray scale of the second pixels are rewritten so as to display black. On the other hand, the common voltage, which is supplied to the common electrode, is applied to the pixel electrode of each of pixels other than the first pixels and the second pixels among the above-mentioned plurality of pixels. That is, the common electric potential is supplied to the pixel electrode of each of the “in-area” pixels excluding the first pixels and the second pixels and further to the pixel electrode of each of pixels located outside the area section. In the preceding sentence, the term “in-area” pixels means pixels located inside the area section. Therefore, no electric potential difference arises between the pixel electrode of each of these pixels and the common electrode. Thus, a gray scale that is to be displayed thereat does not change.

Next, in the second partial rewriting step, the first voltage, which is an electric potential that is used for white display, is supplied to the third pixels located in the area section, which should be rewritten from black into white, and to the fourth pixels located in the area section, which should be rewritten from white into white. As a result of the application of the first electric potential thereto, the gray scale of the third pixels and the gray scale of the fourth pixels are rewritten so as to display white. On the other hand, the common voltage, which is supplied to the common electrode, is applied to the pixel electrode of each of pixels other than the third pixels and the fourth pixels among the above-mentioned plurality of pixels. That is, the common electric potential is supplied to the pixel electrode of each of the above-defined in-area pixels excluding the third pixels and the fourth pixels and further to the pixel electrode of each of pixels located outside the area section. Therefore, no electric potential difference arises between the pixel electrode of each of these pixels and the common electrode. Thus, a gray scale that is to be displayed thereat does not change.

In the method for driving an electrophoretic display device according to the second aspect of the invention described above, the rewriting of an original display image is performed through the first partial rewriting step and the second partial rewriting step. Through these partial rewriting steps, it is possible to rewrite the gradation of each in-area pixel located in the area section into a desired target gradation. That is, it is possible perform the rewriting of the gradation of each of the first pixels, which should be rewritten from the first gradation into the second gradation, the gradation of each of the second pixels, which should be rewritten from the second gradation into the second gradation, the gradation of each of the third pixels, which should be rewritten from the second gradation into the first gradation, and the gradation of each of the fourth pixels, which should be rewritten from the first gradation into the first gradation. On the other hand, no electric potential difference arises between the pixel electrode and the common electrode in each of the pixels located outside the area section, which should retain its original gray scale without any switchover. Therefore, there occurs no gradation change thereat. Therefore, if the method for driving an electrophoretic display device according to the first aspect of the invention described above is used, it is possible to partially rewrite an image that is displayed in the area section. The area section is preset as, for example, a part of the image display area where rewriting frequently occurs or at least with greater frequency than that of other area part. The shape of the area section is not specifically limited herein. As a typical example thereof, the area section is set as a rectangular area.

In the foregoing summary explanation of the second aspect of the invention, it is explained that an electric potential that is the same as the common voltage is supplied to the pixel electrode provided in each of the pixels at which no gradation change should occur in the first partial rewriting step and the second partial rewriting step. However, the scope of this aspect of the invention is not limited to such a specific example. For example, they may be put into an electrically disconnected high impedance state. That is, the pixel electrode of each of pixels other than the first pixels and the second pixels among the above-mentioned plurality of pixels may be put into a high impedance state in the first partial rewriting step. The pixel electrode of each of pixels other than the third pixels and the fourth pixels among the above-mentioned plurality of pixels may be put into a high impedance state in the second partial rewriting step. Even with such modification, just in the same manner as done by supplying the same level of a voltage thereto as the common voltage mentioned above, it is possible to avoid any electric potential difference from arising between the pixel electrode and the common electrode in each of the plurality of pixels at which its original gradation should be retained. Thus, it is possible to retain its original gray scale thereat.

In the method for driving an electrophoretic display device according to the second aspect of the invention described above, it should be particularly noted that image rewriting is performed only for the in-area pixels that are located inside the area section. That is, image rewriting is not performed for the above-mentioned remaining pixels that are located outside the area section. That is, a voltage is applied only between the pixel electrode and the common electrode of each of the in-area pixels located in the area section in which an image-rewriting target image, which is an image that is to be rewritten, is presented. No voltage is applied to the above-mentioned remaining pixels that are located outside the area section. For this reason, it is not only possible to reduce power consumption but also possible to reduce degradation in an image display unit due to the occurrence of an electric potential difference between electrodes. Moreover, it is possible to avoid the occurrence of flicker due to rewriting performed at the pixels at which their original gradation should be retained. Furthermore, it is possible to avoid a decrease in contrast due to kickback, which is an undesirable gradation change that occurs immediately after the stopping of the supply of a voltage.

Furthermore, in the method for driving an electrophoretic display device according to the second aspect of the invention described above, it is possible at the area part outside the area section to prevent any undesirable gradation difference such as a gray scale difference from arising because of the successive writing of the same gray scale into a pixel. For example, the gray scale of a certain pixel in which black is successively written immediately after black display may differ from the gray scale of another pixel in which black is written immediately after white display. In this respect, since black is not successively written into any pixel whose preceding display gray scale is black in the area part outside the area section, the method for driving an electrophoretic display device according to the second aspect of the invention described above ensures that a gray-scale difference that is attributable to the successive writing of the same gray scale explained above does not arise at the above-mentioned area part excluding the area section.

In addition, since image-rewriting operation is performed through the first partial rewriting step and the second partial rewriting step, it is possible to make the number of times of the writing of the first gradation equal to the number of times of the writing of the second gradation. Therefore, for example, it is possible to reduce degradation in the electrophoretic element. Notwithstanding the above, however, if it suffices to rewrite either one of the first gradation and the second gradation only, that is, not both, for the rewriting of an original image, either the first partial rewriting step or the second partial rewriting step may be omitted.

As explained briefly above, the method for driving an electrophoretic display device according to the second aspect of the invention described above achieves partial rewriting of a display image. By this means, it is possible to display an image with high quality while reducing power consumption and reducing degradation.

In order to address the above-identified problems without any limitation thereto, the invention provides, as a third aspect thereof, a method for driving an electrophoretic display device that is provided with a display unit having a plurality of pixels in each of which an electrophoretic element containing a plurality of electrophoretic particles is sandwiched between a pixel electrode and a common electrode that face each other, the driving method including: a first partial rewriting step of, when an image that is displayed in a rewrite area that makes up at least a part of the display unit is rewritten, partially rewriting the image that is displayed on the display unit by supplying a common voltage to the common electrode, by supplying a second voltage to the pixel electrode of each of first pixels among pixels located in the rewrite area, the above-mentioned each of the first pixels displaying a first gradation before the rewriting of the image, the second voltage being set so as to correspond to a second gradation that is different from the first gradation, and by supplying a voltage that is the same as the common voltage to the pixel electrode of each of pixels other than the first pixels among the pixels located in the rewrite area or by putting the pixel electrode of each of pixels other than the first pixels among the pixels located in the rewrite area into a high impedance state; and a second partial rewriting step of, when the image that is displayed in the rewrite area that makes up at least a part of the display unit is rewritten, partially rewriting the image that is displayed on the display unit by supplying the common voltage to the common electrode, by supplying a first voltage to the pixel electrode of each of second pixels among the pixels located in the rewrite area, the above-mentioned each of the second pixels displaying the first gradation after the rewriting of the image, the first voltage being set so as to correspond to the first gradation, and by supplying a voltage that is the same as the common voltage to the pixel electrode of each of pixels other than the second pixels among the pixels located in the rewrite area or by putting the pixel electrode of each of pixels other than the second pixels among the pixels located in the rewrite area into a high impedance state.

In the method for driving an electrophoretic display device according to the third aspect of the invention described above, a common voltage is supplied to the common electrode in a first partial rewriting step when an image that is displayed in a rewrite area that makes up at least a part of the display unit is rewritten. A second voltage is supplied to the pixel electrode of each of first pixels among pixels located in the rewrite area. The above-mentioned each of the first pixels displays a first gradation before the rewriting of the image. The second voltage is set so as to correspond to a second gradation that is different from the first gradation. Herein, the term “rewrite area” means an area part, area section, or the like that is conceptually set at the time of the rewriting of an original display image. As a typical example thereof, the rewrite area is set as a rectangular area. The shape of the rewrite area is not limited to such a specific example. The rewrite area is set as an area part, area section, or the like in which pixels whose gradation is subject to change are located. That is, the rewrite area is set as an area part, area section, or the like where image rewriting is performed. Notwithstanding the above, however, the rewrite area may include any pixel whose gradation is not changed. That is, the rewrite area may include any area where image rewriting is not performed. Or, as a non-limiting exemplary configuration thereof, the entire image display area may be set as the rewrite area.

Subsequent to the first partial rewriting step, in the method for driving an electrophoretic display device according to the third aspect of the invention described above, a common voltage is supplied to the common electrode in a second partial rewriting step as done in the first partial rewriting step. A first voltage is supplied to the pixel electrode of each of second pixels among the pixels located in the rewrite area. The above-mentioned each of the second pixels displays the first gradation after the rewriting of the image. The first voltage is set so as to correspond to the first gradation. Note that the same pixel may be included in both the first pixels and the second pixels mentioned herein.

In the method for driving an electrophoretic display device according to the third aspect of the invention described above, the rewriting of an original display image is performed through the first partial rewriting step and the second partial rewriting step. Through these partial rewriting steps, it is possible to rewrite the gradation of each pixel whose gradation should change over into a desired target gradation without failure. That is, the gradation of each of the first pixels among the pixels located in the rewrite area is rewritten from the first gradation into the second gradation through the first partial rewriting step. Each of the first pixels displays the first gradation before the rewriting of the image. Thereafter, the gradation of each of the second pixels among the pixels located in the rewrite area is rewritten from the second gradation into the first gradation through the second partial rewriting step. Each of the second pixels displays the first gradation after the rewriting of the image. By this means, it is possible to rewrite the gradation of each pixel whose gradation should change over into a desired target gradation without failure. On the other hand, no electric potential difference arises between the pixel electrode and the common electrode in each of the plurality of pixels other than the first pixels and the second pixels mentioned above. Therefore, there occurs no gradation change thereat. Therefore, if the method for driving an electrophoretic display device according to the third aspect of the invention described above is used, it is possible to partially rewrite an image that is displayed in the rewrite area.

In the foregoing summary explanation of the third aspect of the invention, it is explained that an electric potential that is the same as the common voltage is supplied to the pixel electrode provided in each of the pixels at which no gradation change should occur in the first partial rewriting step and the second partial rewriting step. However, the scope of this aspect of the invention is not limited to such a specific example. For example, they may be put into an electrically disconnected high impedance state. That is, the pixel electrode of each of pixels other than the first pixels may be put into a high impedance state in the first partial rewriting step. The pixel electrode of each of pixels other than the second pixels may be put into a high impedance state in the second partial rewriting step. Even with such modification, just in the same manner as done by supplying the same level of a voltage thereto as the common voltage mentioned above, it is possible to avoid any electric potential difference from arising between the pixel electrode and the common electrode in each of the plurality of pixels at which its original gradation should be retained. Thus, it is possible to retain its original gray scale thereat.

In the method for driving an electrophoretic display device according to the third aspect of the invention described above, it should be particularly noted that image rewriting is performed only for pixels at which a gradation changeover should occur. That is, image rewriting is not performed for pixels at which their original gradation should be retained. This means that image-rewriting operation is performed in a partial manner. For this reason, it is not only possible to reduce power consumption but also possible to reduce degradation in an image display unit due to the occurrence of an electric potential difference between electrodes. Moreover, it is possible to avoid the occurrence of flicker due to rewriting performed at the pixels at which their original gradation should be retained. Furthermore, it is possible to avoid a decrease in contrast due to kickback, which is an undesirable gradation change that occurs immediately after the stopping of the supply of a voltage.

Furthermore, if the method for driving an electrophoretic display device according to the third aspect of the invention described above is adopted, it is possible to prevent any undesirable gradation difference such as a gray scale difference from arising because of the successive writing of the same gray scale into a pixel. For example, the gray scale of a certain pixel in which black is successively written immediately after black display may differ from the gray scale of another pixel in which black is written immediately after white display. In this respect, since black is not successively written into any pixel whose preceding display gray scale is black, the method for driving an electrophoretic display device according to the third aspect of the invention described above ensures that a gray-scale difference that is attributable to the successive writing of the same gray scale explained above does not arise.

In addition, since image-rewriting operation is performed through the first partial rewriting step and the second partial rewriting step, it is possible to make the number of times of the writing of the first gradation equal to the number of times of the writing of the second gradation. Therefore, for example, it is possible to reduce degradation in the electrophoretic element. Notwithstanding the above, however, if it suffices to rewrite either one of the first gradation and the second gradation only, that is, not both, for the rewriting of an original image, either the first partial rewriting step or the second partial rewriting step may be omitted.

In the method for driving an electrophoretic display device according to the third aspect of the invention described above, the second gradation is displayed in all pixels located in the rewrite area during a time period from the completion of the first partial rewriting step to the starting of the second partial rewriting step. That is, an all-one gradation image, which has the second gradation only, is displayed in the rewrite area. By this means, it is possible to avoid any partially rewritten image from being shown during the execution of image-rewriting operation.

As explained briefly above, the method for driving an electrophoretic display device according to the third aspect of the invention described above achieves partial rewriting of a display image. By this means, it is possible to display an image with high quality while reducing power consumption and reducing degradation.

In the method for driving an electrophoretic display device according to the third aspect of the invention described above, it is preferable that, throughout the first partial rewriting step and the second partial rewriting step, a voltage that is the same as the common voltage should be supplied to the pixel electrode of each of pixels that are located in a non-rewrite area of the display unit, which does not include the rewrite area of the display unit, or the pixel electrode of each of pixels that are located in the non-rewrite area of the display unit should be put into a high impedance state.

In such a preferred driving method, there arises no electric potential difference between the common electrode and the pixel electrode of each of the pixels that are located in the non-rewrite area of the image display unit, which does not include the rewrite area thereof, in the first partial rewriting step and the second partial rewriting step. For this reason, it is not only possible to reduce power consumption but also possible to reduce degradation in the image display unit due to the occurrence of an electric potential difference between electrodes. Moreover, it is possible to avoid the occurrence of flicker due to rewriting performed at the pixels at which their original gradation should be retained. Furthermore, it is possible to avoid a decrease in contrast due to kickback, which is an undesirable gradation change that occurs immediately after the stopping of the supply of a voltage.

Greater effects of the preferred driving method described above can be expected when the area occupancy, that is, area percentage, of the rewrite area in the entire image display area is relatively small. Therefore, the preferred driving method described above is very effective when used in such a case where, for example, an image-rewriting target area, which is an area at which image-rewriting operation should be performed, occupies only a small part of the entire image display area.

In order to address the above-identified problems without any limitation thereto, the invention provides, as a fourth aspect thereof, an electrophoretic display device that is driven by the electrophoretic display device driving method according to the first aspect of the invention described above.

Since the electrophoretic display device according to the fourth aspect of the invention is driven by means of the electrophoretic display device driving method according to the first aspect of the invention described above, the same advantageous effects as those of the driving method according to the first aspect of the invention described above are produced. That is, it is possible to display an image with high quality while reducing power consumption and reducing degradation.

In order to address the above-identified problems without any limitation thereto, the invention provides, as a fifth aspect thereof, an electronic apparatus that is provided with the electrophoretic display device according to the fourth aspect of the invention described above, including its preferred configurations.

According to an electronic apparatus of this aspect of the invention, it is possible to embody various kinds of electronic devices that are capable of displaying an image with high quality while reducing power consumption and reducing degradation, including but not limited to, a watch, a sheet of electronic paper, an electronic notebook, a mobile phone, a handheld audio device, and so forth, because the electronic apparatus of this aspect of the invention is provided with the electrophoretic display device according to the above-described aspect of the invention.

These and other features, operations, and advantages of the present invention will be fully understood by referring to the following detailed description of exemplary embodiments in conjunction with the accompanying drawings.

BRIEF DESCRIPTION OF THE DRAWINGS

The invention will be described with reference to the accompanying drawings, wherein like numbers reference like elements.

FIG. 16 is a conceptual diagram that schematically illustrates, on an area-by-area basis, an example of a driving method that is implemented in the first partial rewriting step according to a third embodiment of the invention.

FIG. 17 is a conceptual diagram that schematically illustrates, on an area-by-area basis, an example of a driving method that is implemented in the second partial rewriting step according to the third embodiment of the invention.

DESCRIPTION OF EXEMPLARY EMBODIMENTS

With reference to the accompanying drawings, exemplary embodiments of the present invention are described below.

Electrophoretic Display Device

First of all, an example of the general configuration of an electrophoretic display panel of an electrophoretic display device according to the present embodiment of the invention is explained below while referring to FIGS. 1 and 2.

Figure 1:
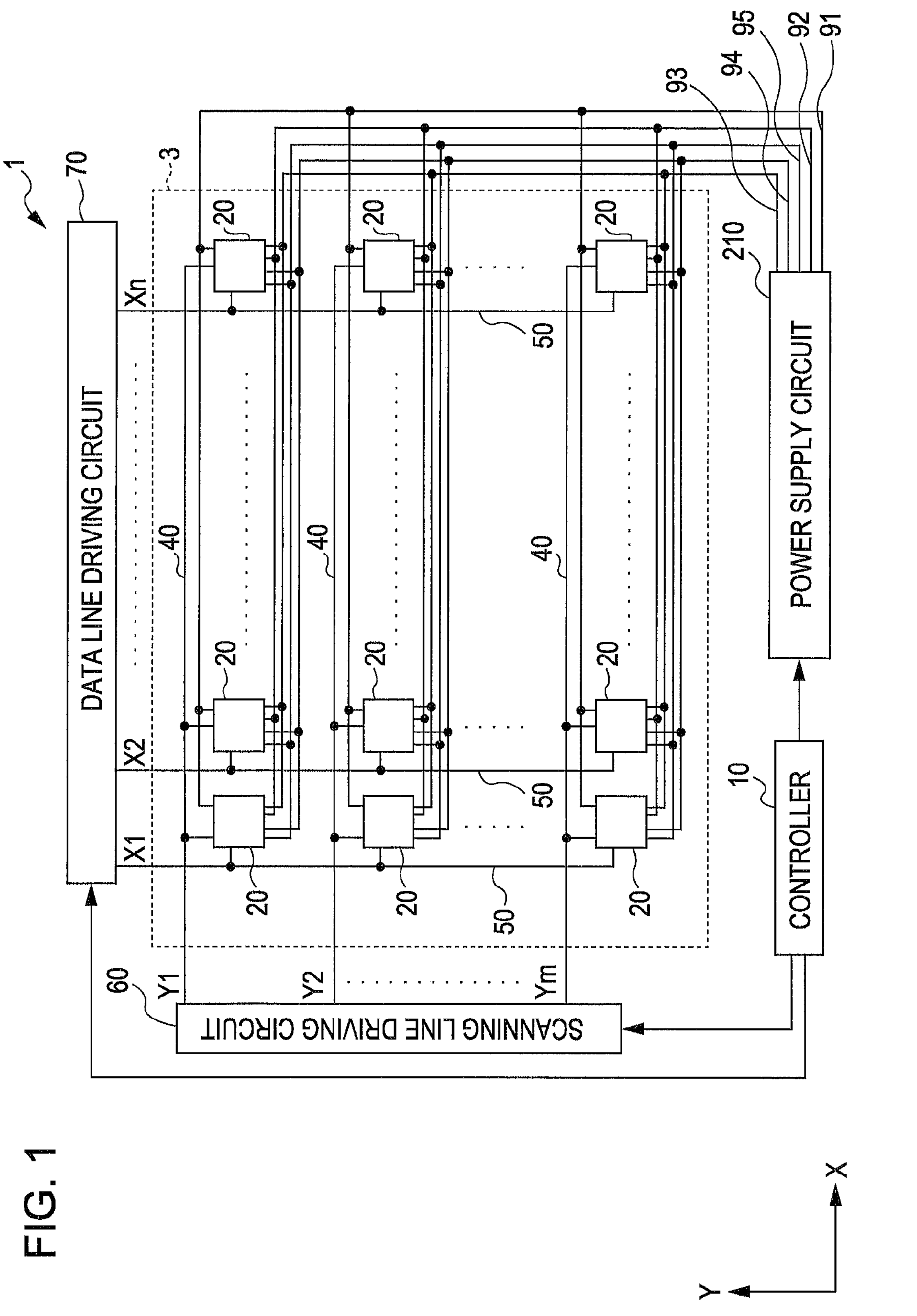
FIG. 1 is a block diagram that schematically illustrates an example of the general configuration of an electrophoretic display panel according to an exemplary embodiment of the invention.

FIG. 1 is a block diagram that schematically illustrates an example of the general configuration of an electrophoretic display panel according to an exemplary embodiment of the invention.

As illustrated in FIG. 1, an electrophoretic display panel 1 according to the present embodiment of the invention is provided with an image display unit 3, a scanning line driving circuit 60, and a data line driving circuit 70 as its main components. The image display unit 3 may be hereafter referred to as “display area”.

A plurality of pixels 20 is arrayed in a matrix pattern in the display area 3. When viewed in plan, the pixel-array matrix is made up of “m” rows and “n” columns. In addition, m number of scanning lines 40, which are denoted as Y1, Y2, . . . , Ym in the accompanying drawings, and n number of data lines 50, which are denoted as X1, X2, . . . , Xn therein, are provided in the display area 3. These m scanning lines 40 and n data lines 50 intersect with each other. Specifically, each of these m scanning lines 40 extends in the direction of the row, that is, in the X direction, whereas each of these n data lines 50 extends in the direction of the column, that is, in the Y direction. Each of the plurality of pixels 20 is provided at the intersection of the corresponding row of these m scanning lines 40 and the corresponding column of these n data lines 50. More exactly, each of the plurality of pixels 20 is provided at a position corresponding to such an intersection.

The scanning line driving circuit 60 supplies scanning signals to the scanning lines Y1, Y2, . . . , Ym in a pulsed and sequential manner on the basis of a timing signal. On the other hand, the data line driving circuit 70 supplies image signals to the data lines X1, X2, . . . , Xn on the basis of the timing signal. The image signal takes a binary level. The binary level is made up of a high electric potential, that is, a high voltage level, and a low electric potential, that is, a low voltage level. For example, the voltage level of the image signal is either 5V or 0V. In the following description of this specification, a high electric potential or a high voltage level may be simply referred to as “high level” or “H level”. A low electric potential or a low voltage level may be simply referred to as “low level” or “L level”.

Each of the plurality of pixels 20 is electrically connected to a high voltage power supply line (i.e., high electric-potential power supply line) 91, a low voltage power supply line (i.e., low electric-potential power supply line) 92, a common voltage line (i.e., common electric-potential line) 93, a first control line 94, and a second control line 95. As a typical circuit line configuration of the electrophoretic display panel 1, each of the high voltage power supply line 91, the low voltage power supply line 92, the common voltage line 93, the first control line 94, and the second control line 95 is provided as an "m-branched" common line. Each branched common line is connected to the n number of the pixels 20 that are aligned in a row that extends in the X direction as illustrated in FIG. 1. That is, as a typical circuit line configuration thereof, each of these lines 91, 92, 93, 94, and 95 provides electric connection to each of the m number pixel rows, where each pixel row is made up of the n number of the pixels 20 arrayed adjacent to one another in the X direction.

Figure 2:
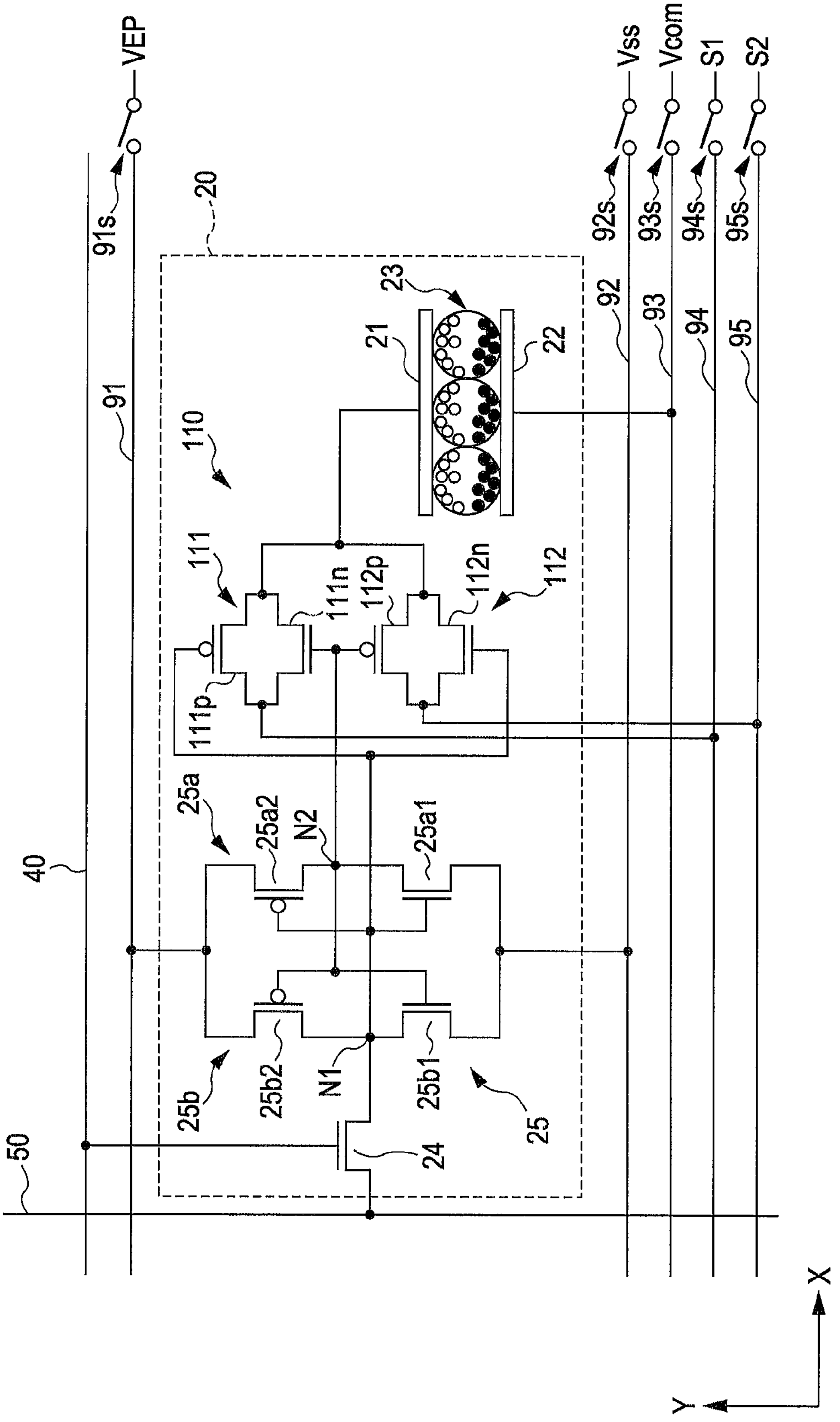
FIG. 2 is an equivalent circuit diagram that schematically illustrates an example of the electric configuration of a pixel.

FIG. 2 is an equivalent circuit diagram that schematically illustrates an example of the electric configuration of a pixel.

As illustrated in FIG. 2, the pixel 20 includes a pixel-switching transistor 24, a memory circuit 25, a switching circuit 110, a pixel electrode 21, a common electrode 22, and an electrophoretic element 23.

The pixel-switching transistor 24 is configured as, for example, an N-type transistor. The gate electrode of the pixel-switching transistor 24 is electrically connected to the scanning line 40. The source electrode of the pixel-switching transistor 24 is electrically connected to the data line 50. The drain electrode of the pixel-switching transistor 24 is electrically connected to the input terminal N1 of the memory circuit 25. The pixel-switching transistor 24 receives an image signal that is supplied from the data line driving circuit 70 shown in FIG. 1 through the data line 50. Then, the pixel-switching transistor 24 outputs the received image signal to the input terminal N1 of the memory circuit 25 at the timing of the reception of a scanning signal. The scanning signal is supplied from the scanning line driving circuit 60 shown in FIG. 1 through the scanning line 40 in a pulse pattern.

The memory circuit 25 is, for example, configured as a static random access memory (SRAM) that has two inverter circuits 25*a* and 25*b*.

The pair of inverters 25*a* and 25*b* constitutes an electrically looped structure. In such an electrically looped structure, the input terminal of one inverter circuit is electrically connected to the output terminal of the other. In addition thereto, the input terminal of the other inverter circuit is electrically connected to the output terminal of the above-mentioned one. Specifically, the input terminal of the inverter circuit 25*a* and the output terminal of the inverter circuit 25*b* are electrically connected to each other; and in addition thereto, the input terminal of the inverter circuit 25*b* and the output terminal of the inverter circuit 25*a* are electrically connected to each other. The input terminal of the inverter circuit 25*a* is provided as the input terminal N1 of the memory circuit 25. The output terminal of the inverter circuit 25*a* is provided as the output terminal N2 of the memory circuit 25.

The inverter circuit 25*a* includes an N-type transistor 25*a*1 and a P-type transistor 25*a*2. The gate electrode of each of the N-type transistor 25*a*1 and the P-type transistor 25*a*2 is electrically connected to the input terminal N1 of the memory circuit 25. The source electrode of the N-type transistor 25*a*1 is electrically connected to the low voltage power supply line 92. A low power supply voltage Vss is supplied to the low voltage power supply line 92. On the other hand, the source electrode of the P-type transistor 25*a*2 is electrically connected to the high voltage power supply line 91. A high power supply voltage VEP is supplied to the high voltage power supply line 91. The drain electrode of each of the N-type transistor 25*a*1 and the P-type transistor 25*a*2 is electrically connected to the output terminal N2 of the memory circuit 25.

The inverter circuit 25*b* includes an N-type transistor 25*b*1 and a P-type transistor 25*b*2. The gate electrode of each of the N-type transistor 25*b*1 and the P-type transistor 25*b*2 is electrically connected to the output terminal N2 of the memory circuit 25. The source electrode of the N-type transistor 25*b*1 is electrically connected to the low voltage power supply line 92, which the low power supply voltage Vss is supplied to. On the other hand, the source electrode of the P-type transistor 25*b*2 is electrically connected to the high voltage power supply line 91, which the high power supply voltage VEP is supplied to. The drain electrode of each of the N-type transistor 25*b*1 and the P-type transistor 25*b*2 is electrically connected to the input terminal N1 of the memory circuit 25.

When an image signal of the high level defined above is inputted into the input terminal N1 thereof, the memory circuit 25 outputs the low power supply voltage Vss from the output terminal N2 thereof. On the other hand, when an image signal of the low level defined above is inputted into the input terminal N1 thereof, the memory circuit 25 outputs the high power supply voltage VEP from the output terminal N2 thereof. That is, depending on whether the voltage level of the image signal inputted therein is high or low, the memory circuit 25 outputs the low power supply voltage Vss or the high power supply voltage VEP. In other words, the memory circuit 25 is capable of memorizing the inputted image signal as the low power supply voltage Vss or the high power supply voltage VEP.

A power supply circuit 210 can supply the high power supply voltage VEP to the high voltage power supply line 91. In addition, the power supply circuit 210 can supply the low power supply voltage Vss to the low voltage power supply line 92. The high voltage power supply line 91 is electrically connected to the power supply circuit 210 via a switch 91*s*. The low voltage power supply line 92 is electrically connected to the power supply circuit 210 via a switch 92*s*. A controller 10 performs control so that each of these switches 91*s* and 92*s* should be switched over between an ON state and an OFF state. When the switch 91*s* is turned ON, the high voltage power supply line 91 is electrically connected to the power supply circuit 210. When the switch 91*s* is turned OFF, the high voltage power supply line 91 is electrically disconnected from the power supply circuit 210, which is a high impedance state. When the switch 92*s* is turned ON, the low voltage power supply line 92 is electrically connected to the power supply circuit 210. When the switch 92*s* is turned OFF, the low voltage power supply line 92 is electrically disconnected from the power supply circuit 210, which is a high impedance state.

The switching circuit 110 includes a first transmission gate 111 and a second transmission gate 112.

The first transmission gate 111 includes a P-type transistor 111*p* and an N-type transistor 111*n*. The source electrode of each of the P-type transistor 111*p* and the N-type transistor 111*n* is electrically connected to the first control line 94. The drain electrode of each of the P-type transistor 111*p* and the N-type transistor 111*n* is electrically connected to pixel electrode 21. The gate electrode of the P-type transistor 111*p* is electrically connected to the input terminal N1 of the memory circuit 25. On the other hand, the gate electrode of the N-type transistor 111*n* is electrically connected to the output terminal N2 of the memory circuit 25.

The second transmission gate 112 includes a P-type transistor 112*p* and an N-type transistor 112*n*. The source electrode of each of the P-type transistor 112*p* and the N-type transistor 112*n* is electrically connected to the second control line 95. The drain electrode of each of the P-type transistor 112*p* and the N-type transistor 112*n* is electrically connected to pixel electrode 21. The gate electrode of the P-type transistor 112*p* is electrically connected to the output terminal N2 of the memory circuit 25. On the other hand, the gate electrode of the N-type transistor 112*n* is electrically connected to the input terminal N1 of the memory circuit 25.

The switching circuit 110 selects either one of the first control line 94 and the second control line 95 on the basis of an image signal that is inputted into the memory circuit 25. Then, the switching circuit 110 establishes an electric connection between the selected control line and the pixel electrode 21.

Specifically, upon the inputting of a high-level image signal into the input terminal N1 of the memory circuit 25, the memory circuit 25 outputs the low power supply voltage Vss to the gate electrode of the N-type transistor 111*n* and to the gate electrode of the P-type transistor 112*p*. In addition, upon the inputting of the high-level image signal into the input terminal N1 of the memory circuit 25, the high power supply voltage VEP is outputted to the gate electrode of the P-type transistor 111*p* and to the gate electrode of the N-type transistor 112*n*. As a result thereof, the P-type transistor 112*p* and the N-type transistor 112*n*, which make up the second transmission gate 112, turn into an ON state, whereas the P-type transistor 111*p* and the N-type transistor 111*n*, which make up the first transmission gate 111, turn into an OFF state. On the other hand, upon the inputting of a low-level image signal into the input terminal N1 of the memory circuit 25, the memory circuit 25 outputs the high power supply voltage VEP to the gate electrode of the N-type transistor 111*n* and to the gate electrode of the P-type transistor 112*p*. In addition, upon the inputting of the low-level image signal into the input terminal N1 of the memory circuit 25, the low power supply voltage Vss is outputted to the gate electrode of the P-type transistor 111*p* and to the gate electrode of the N-type transistor 112*n*. As a result thereof, the P-type transistor 111*p* and the N-type transistor 111*n*, which make up the first transmission gate 111, turn into an ON state, whereas the P-type transistor 112*p* and the N-type transistor 112*n*, which make up the second transmission gate 112, turn into an OFF state. That is, when a high-level input image signal is supplied to the input terminal N1 of the memory circuit 25, the second transmission gate 112 only turns ON, whereas, when a low-level input image signal is supplied to the input terminal N1 of the memory circuit 25, the first transmission gate 111 only turns ON.

The pixel electrode 21 of each of the plurality of pixels 20 becomes electrically connected to either the first control line 94 or the second control line 95, which is selected by the switching circuit 110 on the basis of the inputted image signal. When such an electric connection is established between the pixel electrode 21 of each of the plurality of pixels 20 and either the first control line 94 or the second control line 95, an electric potential, that is, a voltage level, S1 or S2 is supplied to the pixel electrode 21 of each of the plurality of pixels 20, or the pixel electrode 21 of each of the plurality of pixels 20 is put into a high impedance state, the switchover of which depends on the ON/OFF state of a switch 94*s* or 95*s*.

The pixel electrode 21 of each pixel 20 is provided so as to face the common electrode 22 with the electrophoretic element 23 being sandwiched therebetween. That is, the pixel electrode 21 and the common electrode 22 are provided opposite to each other with the electrophoretic element 23 being interposed therebetween. Note that a singular form, that is, the electrophoretic element 23 instead of the electrophoretic elements 23, is used herein so as to correctively refer to a plurality of electrophoretic capsules. The common electrode 22 is electrically connected to the aforementioned common voltage line 93, which a common electric potential (i.e., common voltage) Vcom is supplied to. The electric potential circuit 210 can supply the common voltage Vcom to the common voltage line 93. The common voltage line 93 is electrically connected to a common voltage supply circuit 220 via a switch 93*s*. The state of the switch 93*s* is switched over between ON and OFF under the control of the controller 10. When the switch 93*s* is turned ON, the common voltage line 93 is electrically connected to the common voltage supply circuit 220. When the switch 93*s* is turned OFF, the common voltage line 93 is electrically disconnected from the common voltage supply circuit 220, which is a high impedance state.

In the present embodiment of the invention, it is assumed that the common voltage Vcom is supplied to the first control line 94 as the voltage level S1. In addition, it is assumed that a first voltage HI and a second voltage LO are supplied to the second control line 95 as the voltage level S2. For example, the first voltage HI is 15V. The second voltage LO is, for example, 0V. Notwithstanding the above, however, the common voltage Vcom, the first voltage HI, and the second voltage LO may be supplied to each of the first control line 94 and second control line 95. That is, it suffices if three types of voltages, that is, the common voltage Vcom, the first voltage HI, and the second voltage LO are supplied through the first control line 94 and second control line 95. In the configuration of the electrophoretic display panel 1 according to the present embodiment of the invention, the electric potential circuit 210 to which the first control line 94 and the second control line 95 are connected performs a switchover from one voltage to another mentioned above.

When the voltages mentioned above are supplied, the first transmission gate 111 only is switched ON for the pixels 20 to which a low-level image signal is supplied. As the first transmission gate 111 turns ON, the pixel electrode 21 of each of these pixels 20 to which the low-level image signal is applied becomes electrically connected to the first control line 94. Depending on the ON/OFF state of the switch 94*s*, the voltage S1 is supplied from the power supply circuit 210 thereto, or they are put into a high impedance state. On the other hand, the second transmission gate 112 only is switched ON for the pixels 20 to which a high-level image signal is supplied. As the second transmission gate 112 turns ON, the pixel electrode 21 of each of these pixels 20 to which the high-level image signal is applied becomes electrically connected to the second control line 95. Depending on the ON/OFF state of the switch 95*s*, the voltage S2 is supplied from the power supply circuit 210 thereto, or they are put into a high impedance state.

The electrophoretic element 23 is made up of a plurality of microcapsules. Each of these microcapsules includes electrophoretic particles.

Figure 3:
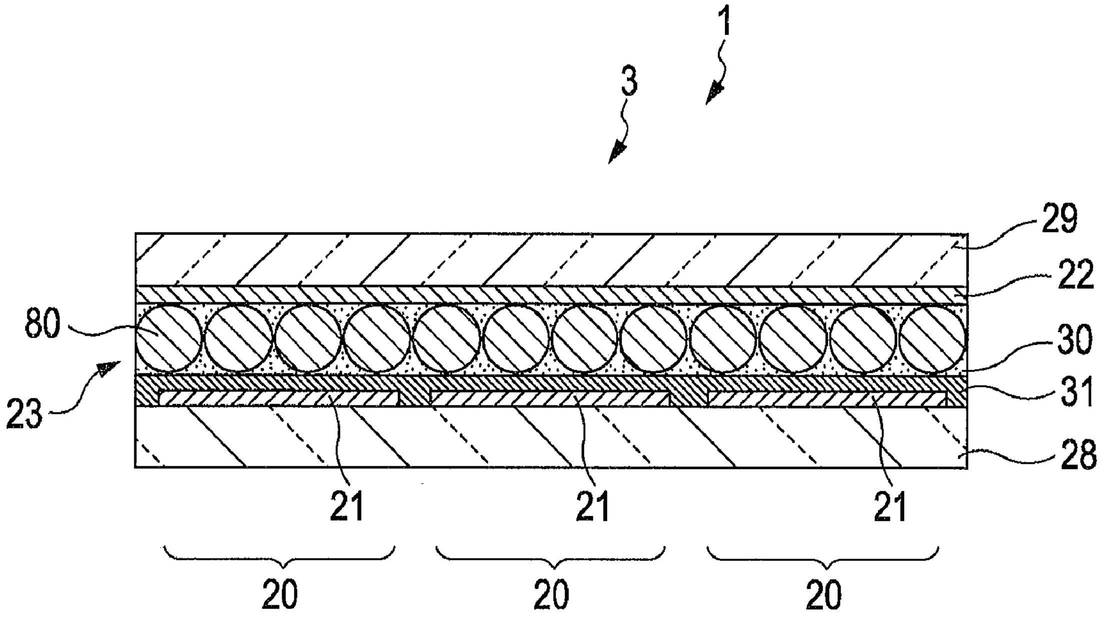
FIG. 3 is a sectional view that schematically illustrates an example of the partial configuration of the image display unit of an electrophoretic display panel according to an exemplary embodiment of the invention.
Figure 4:
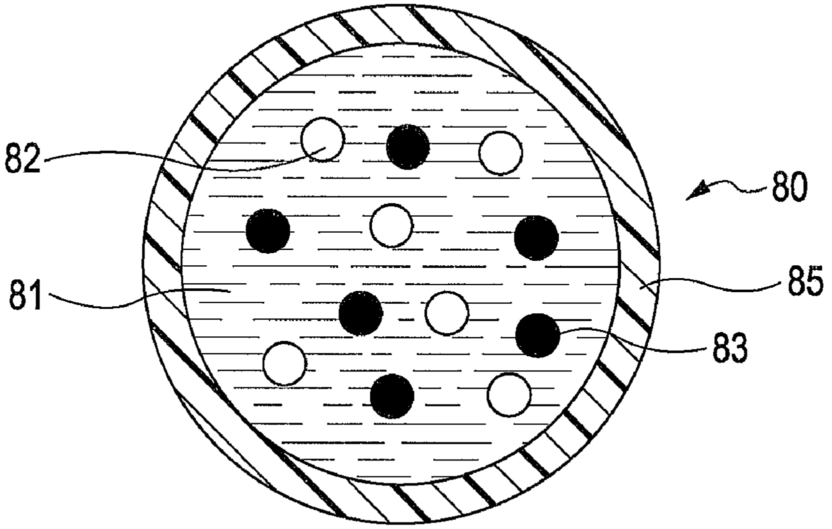
FIG. 4 is a diagram that schematically illustrates an example of the configuration of a microcapsule.

Next, with reference to FIGS. 3 and 4, an explanation is given of an example of the configuration of the image display unit of the electrophoretic display panel according to the present embodiment of the invention.

FIG. 3 is a sectional view that schematically illustrates an example of the partial configuration of the image display unit of an electrophoretic display panel according to an exemplary embodiment of the invention.

As illustrated in FIG. 3, the image display unit 3 includes an element substrate 28 and a counter substrate 29, that is, an opposite substrate. The electrophoretic element 23 is sandwiched between the element substrate 28 and the counter substrate 29. In the configuration of the electrophoretic display panel 1 according to the present embodiment of the invention, it is assumed that images are displayed at the counter-substrate (29) surface side.

The element substrate 28 is a substrate that is made of, for example, glass, plastic, or the like. Though not specifically illustrated in the drawing, a layered structure that is made up of the pixel-switching transistors 24, the memory circuits 25, the switching circuits 110, the scanning lines 110, the data lines 50, the high voltage power supply line 91, the low voltage power supply line 92, the common voltage line 93, the first control line 94, the second control line 95, and so forth is formed over the surface of the element substrate 28. The plurality of pixel electrodes 21 is formed in a matrix layout at a layer over the lamination structure mentioned above.

The counter substrate 29 is a transparent substrate that is made of, for example, glass, plastic, or the like. The common electrode 22 is formed as a solid electrode over the inner surface of the counter substrate 29 that faces the inner surface of the element substrate 28. Accordingly, the common electrode 22 faces the plurality of pixel electrodes 21. The common electrode 22 is made of a transparent electro-conductive material such as magnesium silver (MgAg), indium tin oxide (ITO), or indium zinc oxide (IZO), though not limited thereto.

The electrophoretic element 23 is made up of a plurality of microcapsules 80. Each of these microcapsules 80 contains electrophoretic particles. The electrophoretic element 23 is supported between the element substrate 28 and the counter substrate 29 by means of a binder 30 and an adhesive layer 31. Each of the binder 30 and the adhesive layer 31 is made of, for example, resin or the like. In the manufacturing process of the electrophoretic display panel 1 according to the present embodiment of the invention, an electrophoretic sheet, which has been prepared by bonding the electrophoretic element (i.e., capsules) 23 to the surface of the counter substrate 29 with the use of the binder 30, is bonded to the surface of the layered structure that includes the pixel electrodes 21, which have been formed over the surface of the element substrate 28 in separate film deposition/patterning steps, with the use of the adhesive 31.

The microcapsules 80 are sandwiched between the pixel electrodes 21 and the common electrode 22. Either one or more microcapsule 80 is provided in each pixel 20 of the image display unit 3 of the electrophoretic display panel 1 according to the present embodiment of the invention. In other words, either one or more microcapsule 80 is provided for each of the plurality of pixel electrodes 21.

FIG. 4 is a diagram that schematically illustrates an example of the configuration of a microcapsule. FIG. 4 shows an example of the cross section of one microcapsule.

As illustrated in FIG. 4, a dispersion medium 81, a plurality of white particles 82, and a plurality of black particles 83 are sealed inside a capsule 85 of the microcapsule 80. The microcapsule 80 is formed as a minute spherical body that has a diameter of, for example, approximately 50 μm. Note that the plurality of white particles 82 and the plurality of black particles 83 described herein behave as a non-limiting example of "electrophoretic particles" according to an aspect of the invention.

The capsule 85 functions as the outer shell of the microcapsule 80. The outer shell 85 of the microcapsule 80 is made of, for example, an acrylic resin including but not limited to polymethyl methacrylate or polyethyl methacrylate, a urea resin, or a polymeric resin having optical transparency such as gum arabic or the like.

The dispersion medium 81 is a liquid, a fluid, or the like, the presence of which enables the white particles 82 and the black particles 83 to be dispersed inside the microcapsule 80, that is, inside the capsule 85. The dispersion medium 81 can be formed as either a single chemical element/material/substance or combined chemical elements/materials/substances that is/are selected from, without any intention to limit thereto: water, alcohol solvent such as methanol, ethanol, isopropanol, butanol, octanol, methyl cellosolve or the like, ester kinds such as ethyl acetate, butyl acetate or the like, ketone kinds such as acetone, methyl ethyl ketone, methyl isobutyl ketone or the like, aliphatic hydrocarbon such as pentane, hexane, octane or the like, alicyclic hydrocarbon such as cyclohexane, methylcyclohexane or the like, aromatic hydrocarbon such as benzene kinds having a long-chain alkyl group such as benzene, toluene, xylene, hexyl benzene, butyl benzene, octyl benzene, nonyl benzene, decyl benzene, undecyl benzene, dodecyl benzene, tridecyl benzene, tetradecyl benzene or the like, halogenated hydrocarbon such as methylene chloride, chloroform, carbon tetrachloride, 1,2-dichloroethane or the like, carboxylate, or any other kind of oil and fat. In addition, a surfactant (i.e., surface-active agent) may be combined therewith for the production of the dispersion medium 81.

The white particle 82 is constituted as, for example, a particle (i.e., high polymer or colloid) made of white pigment such as titanium dioxide, hydrozincite (i.e., zinc oxide), antimony trioxide or the like. In the present embodiment of the invention, the white particle 82 is charged negatively though not limited thereto.

On the other hand, the black particle 83 is constituted as, for example, a particle (i.e., high polymer or colloid) made of black pigment such as aniline black, carbon black or the like. In the present embodiment of the invention, the black particle 83 is charged positively though not limited thereto.

Having such a configuration, each of the plurality of white particles 82 and the plurality of black particles 83 can move in the dispersion medium 81 because of an electric field that is generated due to an electric potential difference between the pixel electrode 21 and the common electrode 22.

If necessary, a charge-controlling agent, a dispersing agent, a lubricant, a stabilizing agent, or the like, may be added to these pigments. The charge-controlling agent may be made of particles of, for example, electrolyte, surface-active agent, metallic soap, resin, gum, oil, varnish, or compound, though not limited thereto. The dispersing agent may be a titanium-system coupling agent, an aluminum-system coupling agent, a silane-system coupling agent, though not limited thereto.

When a voltage is applied in such a manner that the voltage level (i.e., electric potential) of the common electrode 22 (refer to FIG. 3) is relatively high in comparison with that of the pixel electrode 21 (refer to FIG. 3), the black particles 83 (refer to FIG. 4), which are positively charged, are drawn to the pixel-electrode (21) side in the microcapsule 80 due to Coulomb force, whereas the white particles 82 (refer to FIG. 4), which are negatively charged, are drawn to the common-electrode (22) side in the microcapsule 80 due to the Coulomb force. Consequently, the white particles 82 gather at the display-surface side of the microcapsule 80, that is, at the common-electrode (22) side. As a result thereof, the color of the white particle 82, that is, white, is displayed on the display surface of the image display unit 3. When a voltage is applied in such a manner that the voltage level of the pixel electrode 21 is relatively high in comparison with that of the common electrode 22, the white particles 82, which are negatively charged, are drawn to the pixel-electrode (21) side in the microcapsule 80 due to Coulomb force, whereas the black particles 83, which are positively charged, are drawn to the common-electrode (22) side in the microcapsule 80 due to the Coulomb force. Consequently, the black particles 83 gather at the display-surface side of the microcapsule 80, that is, at the common-electrode (22) side. As a result thereof, the color of the black particle 83, that is, black, is displayed on the display surface of the image display unit 3.

Depending on the electrophoretic migration state, that is, distribution state, of the white particles 82 and the black particles 83 between the pixel electrode 21 and the common electrode 22, it is possible to display halftone between black and white such as light gray, gray, dark gray, and the like. The pigments used for the white particles 82 and the black particles 83 described above may be replaced by, for example, red, green, and blue one, though not limited thereto. If so modified, the electrophoretic display panel 1 can display, for example, red, green, and blue.

Method for Driving Electrophoretic Display Device

Next, with reference to FIGS. 5-21, exemplary methods for driving an electrophoretic display device having an exemplary configuration described above is explained below.

First Embodiment

First of all, a method for driving an electrophoretic display device according to a first embodiment of the invention is explained while referring to FIGS. 5-11.

Figure 5:
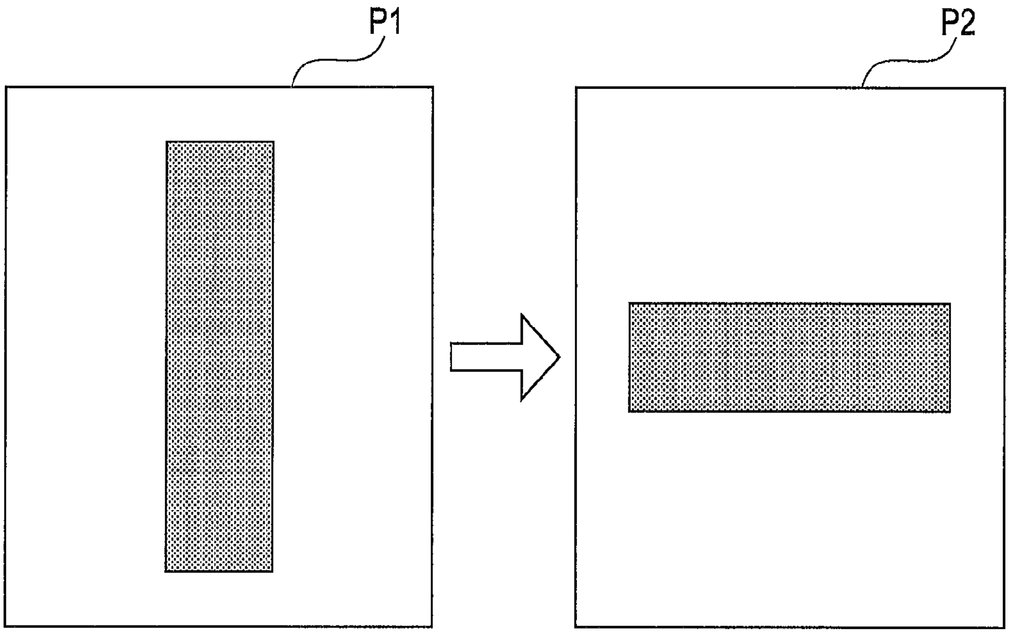
FIG. 5 is a set of diagrams that schematically illustrates, in a plan view, an example of an image displayed before rewriting and an image displayed after rewriting according to an exemplary embodiment of the invention.

FIG. 5 is a set of diagrams that schematically illustrates, in a plan view, an example of an image displayed before rewriting and an image displayed after rewriting according to an exemplary embodiment of the invention.

In the following description of an electrophoretic display device driving method according to the first embodiment of the invention, it is assumed that an image P1 that is displayed on the image display unit 3 before rewriting, which is shown on the left of FIG. 5, is rewritten into an image P2 that is displayed on the image display unit 3 after rewriting, which is shown on the right thereof. In the following description of this specification, the left image P1, which has not been rewritten, may be referred to as an "original display image" or a "before-rewrite display image". The right image P2 may be referred to as a "rewritten display image" or an "after-rewrite display image". That is, in the following example of image-rewriting operations, it is assumed that an original vertical black band that is drawn on a white background is rewritten into a horizontal black band shown on the white background.

Figure 6:
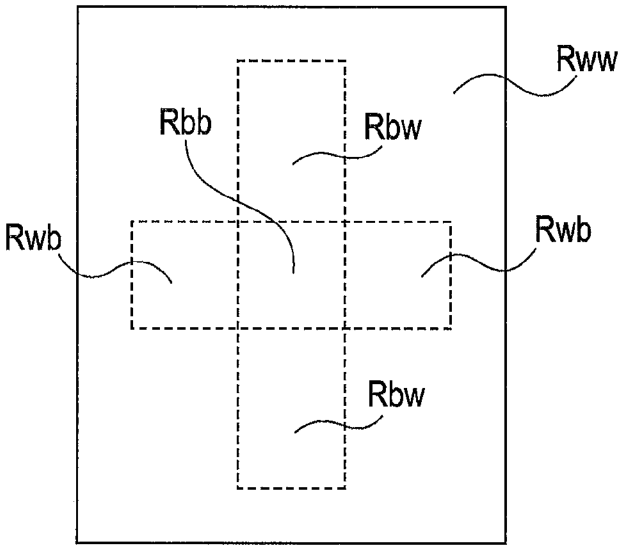
FIG. 6 is a plan view that schematically illustrates an example of an image representing conceptual areas each of which corresponds to a set of a gray scale before rewriting and a gray scale after rewriting according to a first embodiment of the invention.

FIG. 6 is a plan view that schematically illustrates an example of an image representing conceptual areas each of which corresponds to a set of a gray scale before rewriting and a gray scale after rewriting according to a first embodiment of the invention. In the following description of this specification, the gray scale before rewriting may be referred to as an "original gray scale" or a "before-rewrite gray scale", whereas the gray scale after rewriting may be referred to as a "rewritten gray scale" or an "after-rewrite gray scale". The term "gradation" that is used in the recitation of appended claims has a broad meaning and encompasses the meaning of a gray scale used in the description of this specification but not limited thereto.

As shown in FIG. 6, it is possible to conceptually demarcate a display area on the image display unit 3 into four sub areas depending on the set of an original gray scale and a rewritten gray scale defined above. Specifically, it is possible to conceptually divide a display area on the image display unit 3 into the following four sub areas. A first sub area is an area part in which a plurality of pixels that contributes to white display when the original image P1 is displayed and contributes to black display when the rewritten image P2 is displayed is located. The first sub area, which is a "from-white-to-black" sub area or a "white-to-black switchover" sub area, is denoted as Rwb in the following description of this specification as well as in the illustration of the accompanying drawings. A second sub area is an area part in which a plurality of pixels that contributes to white display when the original image P1 is displayed and contributes to white display when the rewritten image P2 is displayed is located. The second sub area, which is a "white non-switchover" sub area, is denoted as Rww in the following description of this specification as well as in the illustration of the accompanying drawings. A third sub area is an area part in which a plurality of pixels that contributes to black display when the original image P1 is displayed and contributes to white display when the rewritten image P2 is displayed is located. The third sub area, which is a "from-black-to-white" sub area or a "black-to-white switchover" sub area, is denoted as Rbw in the following description of this specification as well as in the illustration of the accompanying drawings. Finally, a fourth sub area is an area part in which a plurality of pixels that contributes to black display when the original image P1 is displayed and contributes to black display when the rewritten image P2 is displayed is located. The fourth sub area, which is a "black non-switchover" sub area, is denoted as Rbb in the following description of this specification as well as in the illustration of the accompanying drawings. Note that the sub area Rwb, which is exactly two areas in this example, is collectively referred to as a single area part because of the same gray-scale display behavior, that is, a switchover from white to black. The same holds true for the sub area Rbw except for a switchover from black to white.

As explained in detail below, the rewriting of an original image according to the present embodiment of the invention is performed through a first partial rewriting step (a first partial rewriting period) and a second partial rewriting step (a second partial rewriting period).

Figures 7, 8:
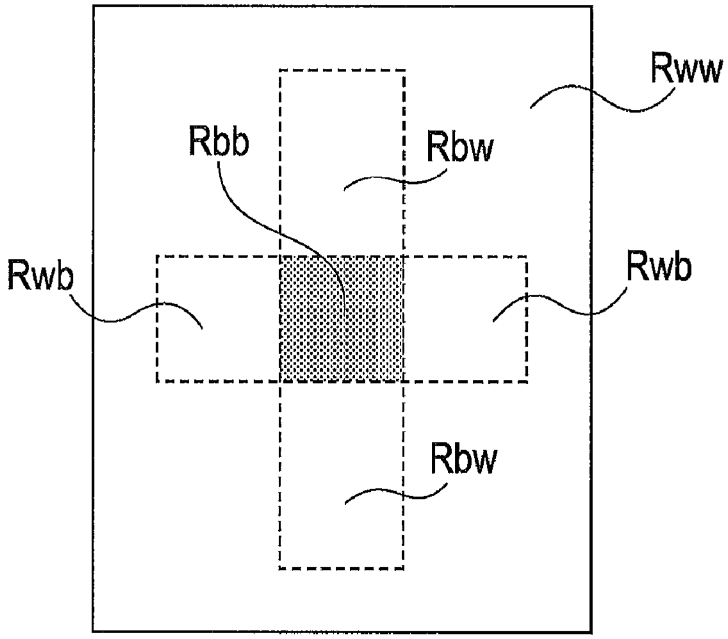
FIG. 7 is a conceptual diagram that schematically illustrates, on an area-by-area basis, an example of a driving method that is implemented in a first partial rewriting step according to the first embodiment of the invention.
FIG. 8 is a plan view that schematically illustrates an example of an image that is displayed after the execution of the first partial rewriting step according to the first embodiment of the invention.

FIG. 7 is a conceptual diagram that schematically illustrates, on an area-by-area basis, an example of a driving method that is implemented in the first partial rewriting step according to the first embodiment of the invention. FIG. 8 is a plan view that schematically illustrates an example of an image that is displayed after the execution of the first partial rewriting step according to the first embodiment of the invention.

As shown in FIGS. 7 and 8, the aforementioned common voltage Vcom is supplied as the aforementioned electric potential S1 to each of the plurality of pixel electrodes 21 that are provided in pixel areas corresponding to the area parts Rww, Rwb, and Rbb in the first partial rewriting step according to the present embodiment of the invention. That is, the common voltage Vcom that has been outputted from the power supply circuit 210 is supplied thereto via the first control line 94. Therefore, no electric potential difference arises between the pixel electrode 21 and the common electrode 22 in each of the plurality of pixels 20 that are located in the pixel areas corresponding to the area parts Rww, Rwb, and Rbb. Therefore, the gray scale of each of the pixels 20 does not change at these area parts Rww, Rwb, and Rbb. On the other hand, the aforementioned second voltage LO is supplied as the aforementioned electric potential S2 to each of the plurality of pixel electrodes 21 that are provided in a pixel area corresponding to the area part Rbw in the first partial rewriting step according to the present embodiment of the invention. That is, the second voltage LO that has been outputted from the power supply circuit 210 is supplied thereto via the second control line 95. The second electric potential LO, which is assumed to be 0V herein but not limited thereto, corresponds to white display. Specifically, there arises an electric potential difference between each of the pixel electrodes 21 provided in the pixel area corresponding to the area part Rbw, which the second electric potential LO is supplied to, and the common electrode 22 to which the common electric potential Vcom is supplied and thus set at the first voltage level HI. Since the voltage level of the common electrode 22 is relatively high in comparison with that of the pixel electrode 21, the white particles 82, which are, for example, negatively charged, are drawn to the common-electrode (22) side whereas the black particles 83, which are, for example, positively charged, are drawn to the pixel-electrode (21) side. As a result of such migration of the electrophoretic particles 82 and 83, the gray scale of the pixels 20 located in the pixel area corresponding to the area part Rbw is rewritten from black into white.

Figures 9, 10:
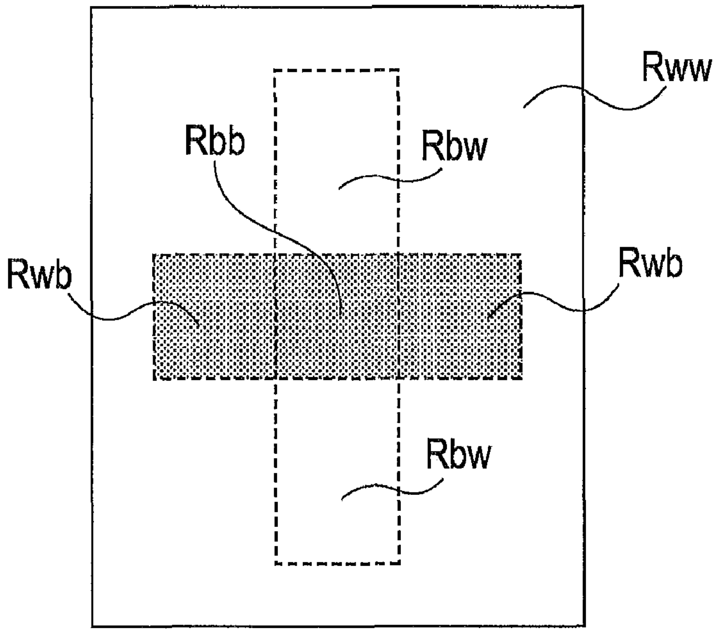
FIG. 9 is a conceptual diagram that schematically illustrates, on an area-by-area basis, an example of a driving method that is implemented in a second partial rewriting step according to the first embodiment of the invention.
FIG. 10 is a plan view that schematically illustrates an example of an image that is displayed after the execution of the second partial rewriting step according to the first embodiment of the invention.

FIG. 9 is a conceptual diagram that schematically illustrates, on an area-by-area basis, an example of a driving method that is implemented in the second partial rewriting step according to the first embodiment of the invention. FIG. 10 is a plan view that schematically illustrates an example of an image that is displayed after the execution of the second partial rewriting step according to the first embodiment of the invention.

As shown in FIGS. 9 and 10, the common voltage Vcom is supplied as the electric potential S1 to each of the plurality of pixel electrodes 21 that are provided in pixel areas corresponding to the area parts Rww, Rbw, and Rbb in the second partial rewriting step according to the present embodiment of the invention. That is, the common voltage Vcom that has been outputted from the power supply circuit 210 is supplied thereto via the first control line 94. Therefore, no electric potential difference arises between the pixel electrode 21 and the common electrode 22 in each of the plurality of pixels 20 that are located in the pixel areas corresponding to the area parts Rww, Rbw, and Rbb. Therefore, the gray scale of each of the pixels 20 does not change at these area parts Rww, Rbw, and Rbb. On the other hand, the aforementioned first voltage HI is supplied as the electric potential S2 to each of the plurality of pixel electrodes 21 that are provided in a pixel area corresponding to the area part Rwb in the second partial rewriting step according to the present embodiment of the invention. That is, the first voltage HI that has been outputted from the power supply circuit 210 is supplied thereto via the second control line 95. The first electric potential HI, which is assumed to be 15V herein but not limited thereto, corresponds to black display. Specifically, there arises an electric potential difference between each of the pixel electrodes 21 provided in the pixel area corresponding to the area part Rwb, which the first electric potential HI is supplied to, and the common electrode 22 to which the common electric potential Vcom is supplied and thus set at the second voltage level LO. Since the voltage level of the pixel electrode 21 is relatively high in comparison with that of the common electrode 22, the black particles 83, which are, for example, positively charged, are drawn to the common-electrode (22) side whereas the white particles 82, which are, for example, negatively charged, are drawn to the pixel-electrode (21) side. As a result of such migration of the electrophoretic particles 82 and 83, the gray scale of the pixels 20 located in the pixel area corresponding to the area part Rwb is rewritten from white into black.

As explained above, the image P1 is rewritten into the image P2 through two partial rewriting steps. In the following description, the level of a voltage that is applied to the pixel electrode 21 in each of the first partial rewriting step and the second partial rewriting step according to the present embodiment of the invention is explained.

Figure 11:
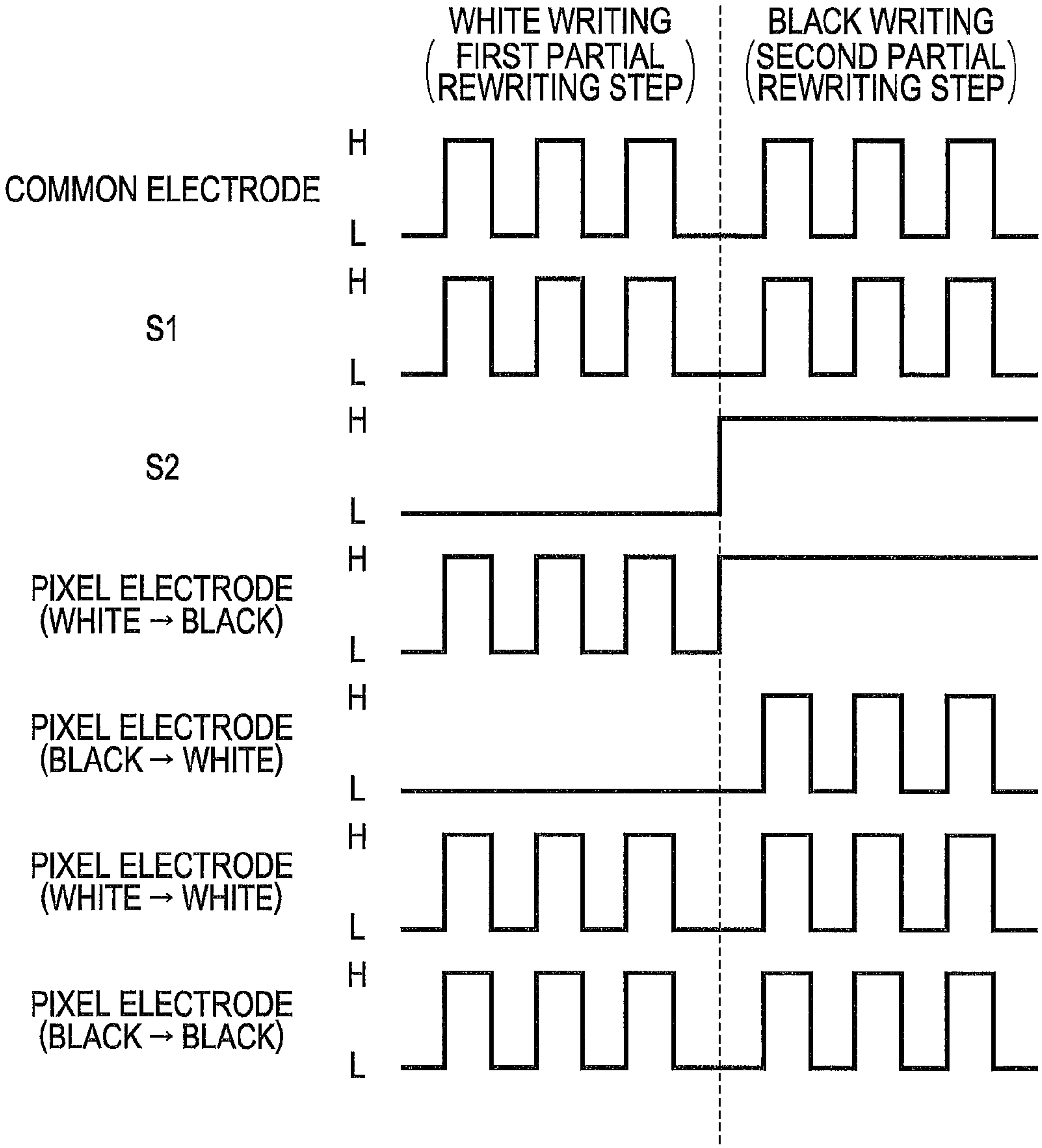
FIG. 11 is a waveform chart according to the first embodiment of the invention, which schematically illustrates an example of the level of a voltage that is supplied to pixels for each of the first partial rewriting step and the second partial rewriting step when image rewriting is performed.

FIG. 11 is a waveform chart according to the first embodiment of the invention, which schematically illustrates an example of the level of a voltage that is supplied to the pixels 20 located in pixel areas corresponding to the area parts Rwb, Rbw, Rww, and Rbb for each of the first partial rewriting step and the second partial rewriting step when image rewriting is performed. It should be noted that FIG. 11 shows a waveform obtained at the time of the writing of an image only. That is, a waveform obtained at the time of the writing of image data into the aforementioned memory circuit 25 (refer to FIG. 2) and the like is not illustrated therein. That is, in a practical implementation of the present embodiment of the invention, image data has been written into the memory circuit 25 prior to the execution of the first partial rewriting step and the second partial rewriting step.

As illustrated in FIG. 11, the common voltage Vcom is supplied to the common electrode 22 throughout the execution of the first partial rewriting step and the second partial rewriting step. In the operation of the electrophoretic display panel 1 according to the present embodiment of the invention, it is assumed that the value of the common voltage Vcom switches over at each lapse of a predetermined time period, which is a so-called "pulsed common level switchover drive scheme". However, the pulsed common level switchover drive scheme is nothing more than an example of various kinds of driving methods that can be applied to an aspect of the invention. For example, the level of the common voltage Vcom may be a fixed value.

The same electric potential as that of the common voltage Vcom is supplied as the electric potential S1. The second electric potential LO that is used for offering white display is supplied as the electric potential S2 in the first partial rewriting step, whereas the first electric potential HI that is used for offering black display is supplied as the electric potential S2 in the second partial rewriting step.

The common voltage Vcom, that is, the electric potential S1, is supplied to each of the plurality of pixel electrodes 21 that are provided in the pixel area corresponding to the "from-white-to-black" area part Rwb in the first partial rewriting step. Then, the first voltage HI, that is, the electric potential S2, is supplied to each of the plurality of pixel electrodes 21 that are provided in the pixel area corresponding to the white-to-black switchover area part Rwb in the second partial rewriting step. As defined earlier, the above-mentioned from-white-to-black sub area Rwb is a conceptually divided part of the image display area that is rewritten from white to black. The second voltage LO, that is, the electric potential S2, is supplied to each of the plurality of pixel electrodes 21 that are provided in the pixel area corresponding to the "from-black-to-white" area part Rbw in the first partial rewriting step. Then, the common voltage Vcom, that is, the electric potential S1, is supplied to each of the plurality of pixel electrodes 21 that are provided in the pixel area corresponding to the black-to-white switchover area part Rbw in the second partial rewriting step. As defined earlier, the above-mentioned from-black-to-white sub area Rbw is a conceptually divided part of the image display area that is rewritten from black to white. The common voltage Vcom, that is, the electric potential S1, is supplied to each of the plurality of pixel electrodes 21 that are provided in the pixel areas corresponding to the area parts Rww and Rbb throughout the execution of the first partial rewriting step and the second partial rewriting step. As defined earlier, each of the sub areas Rww and Rbb is a conceptually divided part of the image display area that retains its original gray scale without any switchover in the course of image rewriting.

As explained above, in a method for driving the electrophoretic display device 1 according to the present embodiment of the invention, the rewriting of an original display image is performed through two steps, that is, the first partial rewriting step and the second partial rewriting step. Through these partial rewriting steps, the gray scale of each of first pixels that should be rewritten from white to black and second pixels that should be rewritten from black to white turns into a desired target gray scale, that is, black for the first pixels and white for the second pixels. On the other hand, no electric potential difference arises between the pixel electrode 21 and the common electrode 22 in each of the plurality of pixels other than the first pixels and the second pixels mentioned above, that is, each pixel that should retain its original gray scale without any switchover. Therefore, there occurs no gray-scale change thereat. Thus, an original image that is displayed on the image display area 3 is rewritten into a desired image without failure.

In the foregoing description of the first embodiment of the invention, it is explained that an electric potential that is the same as the common voltage Vcom is supplied to the pixel electrode 21 provided in each of the pixels 20 at which no gray-scale change should occur in the first partial rewriting step and the second partial rewriting step. However, the scope of this aspect of the invention is not limited to such a specific example. For example, they may be put into an electrically disconnected high impedance state. Even with such modification, just in the same manner as done by supplying the same level of a voltage thereto as the common voltage Vcom explained above, it is possible to avoid any electric potential difference from arising between the pixel electrode 21 and the common electrode 22 in each of the plurality of pixels 20 at which its original gray scale should be retained without any changeover. Thus, it is possible to retain its original gray scale thereat.

In the operation of the electrophoretic display panel 1 according to the present embodiment of the invention, it should be particularly noted that, as explained above, image rewriting is performed only for pixels at which a gray-scale changeover should occur. That is, image rewriting is not performed for pixels at which their original gray scale should be retained. This means that image-rewriting operation is performed in a partial manner. For this reason, it is not only possible to reduce power consumption but also possible to reduce degradation in an image display unit due to the occurrence of an electric potential difference between electrodes. Moreover, it is possible to avoid the occurrence of flicker due to rewriting performed at the pixels at which their original gray scale should be retained. Furthermore, it is possible to avoid a decrease in contrast due to kickback.

Furthermore, if a method for driving the electrophoretic display device 1 according to the present embodiment of the invention is adopted, it is possible to prevent any undesirable gray scale difference from arising because of the successive writing of the same gray scale into a pixel. For example, the gray scale of a certain pixel in which black is successively written immediately after black display may differ from the gray scale of another pixel in which black is written immediately after white display. In this respect, since black is not successively written into any pixel whose preceding display gray scale is black, a method for driving the electrophoretic display device 1 according to the present embodiment of the invention ensures that a gray-scale difference that is attributable to the successive writing of the same gray scale explained above does not arise.

In addition, since image-rewriting operation is performed through the first partial rewriting step and the second partial rewriting step, it is possible to make the number of times of the writing of a first gradation (for example, gray scale but not limited thereto; the same applies hereunder) equal to the number of times of the writing of a second gradation. Therefore, for example, it is possible to reduce degradation in the electrophoretic element 23. Notwithstanding the above, however, if it suffices to rewrite either one of the first gradation and the second gradation only, that is, not both, for the rewriting of an original image, either the first partial rewriting step or the second partial rewriting step may be omitted.

Moreover, it suffices to rewrite gradation for each pixel just once in the above-mentioned two steps of the first partial rewriting step and the second partial rewriting step. For this reason, in comparison with a case where rewriting is performed twice or more, it is possible to reduce degradation in an electrophoretic display device that is attributable to degradation in, for example, the electrophoretic element 23, the pixel electrode 21, or the common electrode 22.

As explained in detail above, a method for driving an electrophoretic display device according to the first embodiment of the invention achieves partial rewriting of a display image. By this means, it is possible to display an image with high quality while reducing power consumption and reducing degradation.

Second Embodiment

Next, a method for driving an electrophoretic display device according to a second embodiment of the invention is explained below while referring to FIGS. 12-15. The method for driving an electrophoretic display device according to the second embodiment of the invention differs from the method for driving an electrophoretic display device according to the first embodiment of the invention explained above in terms of the method of area demarcation. Other features of the second embodiment of the invention are substantially the same as those of the first embodiment of the invention. Therefore, in the following description of the method for driving an electrophoretic display device according to the second embodiment of the invention, an explanation is given with a focus on the differentiating and characteristic features thereof. Note that a detailed explanation of other features of the method for driving an electrophoretic display device according to the second embodiment of the invention may be omitted or simplified in order to avoid redundancy as long as the understanding of the unique features of this aspect of the invention is not impaired. As in the foregoing description of an electrophoretic display device driving method according to the first embodiment of the invention, in the following description of an electrophoretic display device driving method according to the second embodiment of the invention, it is assumed that the image P1 that is displayed on the image display unit 3 before rewriting, which is shown on the left of FIG. 5, is rewritten into the image P2 that is displayed on the image display unit 3 after rewriting, which is shown on the right thereof.

Figure 12:
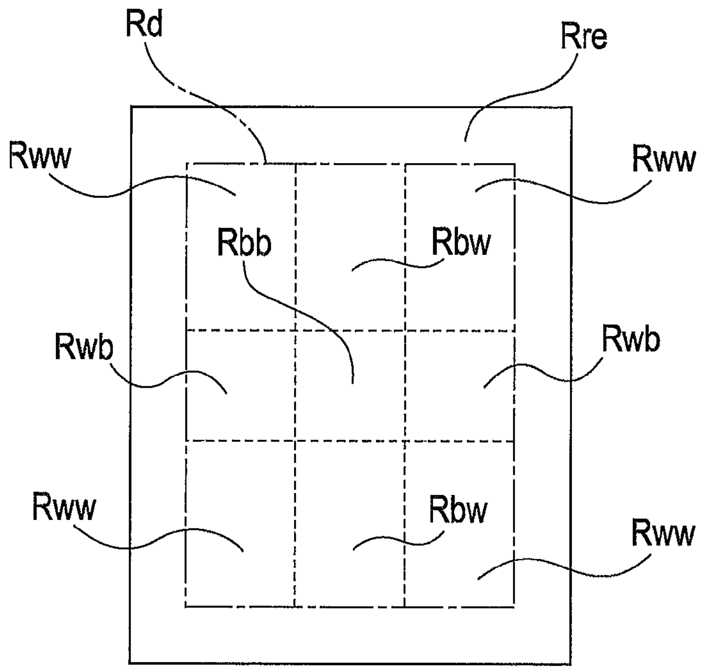
FIG. 12 is a plan view that schematically illustrates an example of an image representing conceptual areas corresponding to a gray scale before rewriting and a gray scale after rewriting according to a second embodiment of the invention.

FIG. 12 is a plan view that schematically illustrates an example of an image representing conceptual areas corresponding to a gray scale before rewriting and a gray scale after rewriting according to an exemplary embodiment of the invention.

As illustrated in FIG. 12, in a method for driving the electrophoretic display device 1 according to the second embodiment of the invention, an original image is partially rewritten inside an area section Rd that includes area parts at which gray-scale switchover occurs as a result of the rewriting thereof, that is, the area parts Rwb and Rbw. Specifically, it is possible to conceptually divide the area section Rd into the following four sub areas. A first sub area is an area part in which a plurality of pixels that contributes to white display when the original image P1 is displayed and contributes to black display when the rewritten image P2 is displayed is located. The first sub area, which is a "from-white-to-black" sub area or a "white-to-black switchover" sub area, is denoted as Rwb in the description of this specification as well as in the illustration of the accompanying drawings. A second sub area is an area part in which a plurality of pixels that contributes to white display when the original image P1 is displayed and contributes to white display when the rewritten image P2 is displayed is located. The second sub area, which is a "from-white-to-white" sub area, is denoted as Rww in the description of this specification as well as in the illustration of the accompanying drawings. A third sub area is an area part in which a plurality of pixels that contributes to black display when the original image P1 is displayed and contributes to white display when the rewritten image P2 is displayed is located. The third sub area, which is a "from-black-to-white" sub area or a "black-to-white switchover" sub area, is denoted as Rbw in the description of this specification as well as in the illustration of the accompanying drawings. Finally, a fourth sub area is an area part in which a plurality of pixels that contributes to black display when the original image P1 is displayed and contributes to black display when the rewritten image P2 is displayed is located. The fourth sub area, which is a "from-black-to-black" sub area, is denoted as Rbb in the description of this specification as well as in the illustration of the accompanying drawings. Note that the sub area Rwb, which is exactly two areas in this example, is collectively referred to as a single area part because of the same gray-scale display behavior, that is, a switchover from white to black. The same holds true for the sub area Rbw except for a switchover from black to white. In addition, the sub area Rww, which is exactly four areas in this example, is also collectively referred to as a single area part. A remaining area part that is not included in the area section Rd is denoted as Rre in the description of the present embodiment of the invention as well as in the illustration of the accompanying drawings.

Figure 13:
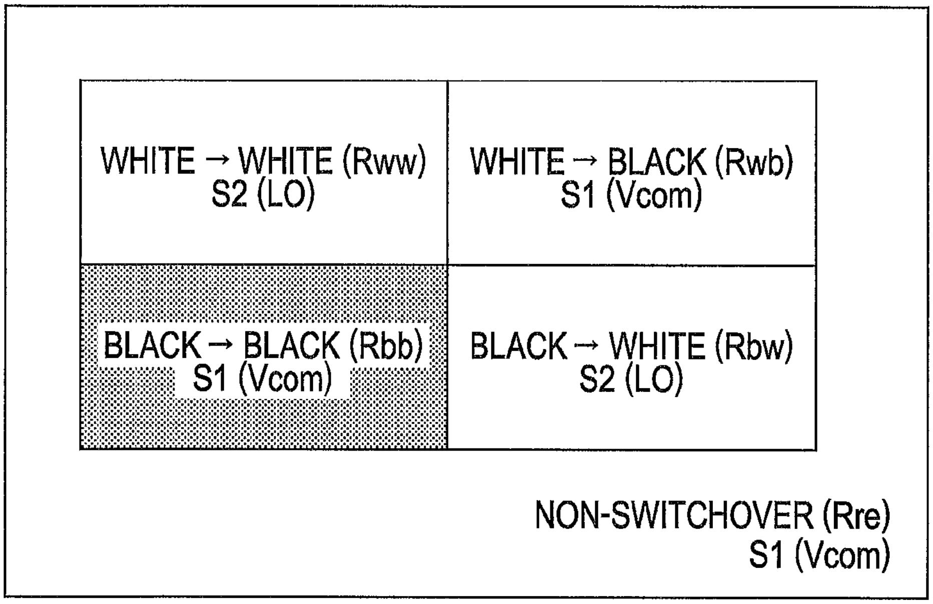
FIG. 13 is a conceptual diagram that schematically illustrates, on an area-by-area basis, an example of a driving method that is implemented in the first partial rewriting step according to the second embodiment of the invention.

FIG. 13 is a conceptual diagram that schematically illustrates, on an area-by-area basis, an example of a driving method that is implemented in the first partial rewriting step according to the second embodiment of the invention.

As shown in FIG. 13, the aforementioned common voltage Vcom is supplied as the aforementioned electric potential S1 to each of the plurality of pixel electrodes 21 that are provided in pixel areas corresponding to the area parts Rwb and Rbb of the area section Rd as well as the area part Rre in the first partial rewriting step according to the present embodiment of the invention. Therefore, no electric potential difference arises between the pixel electrode 21 and the common electrode 22 in each of the plurality of pixels 20 that are located in the pixel areas corresponding to the area parts Rwb and Rbb of the area section Rd as well as the area part Rre. Therefore, the gray scale of each of the pixels 20 does not change at these area parts Rwb, Rbb, and Rre. On the other hand, the aforementioned second voltage LO is supplied as the aforementioned electric potential S2 to each of the plurality of pixel electrodes 21 that are provided in pixel areas corresponding to the area parts Rbw and Rww in the first partial rewriting step according to the present embodiment of the invention. The second electric potential LO corresponds to white display. As a result of the migration of the electrophoretic particles 82 and 83, the gray scale of the pixels 20 located in the pixel area corresponding to the area part Rbw is rewritten from black into white. The gray scale of the pixels 20 located in the pixel area corresponding to the area part Rww is also white both before and after the execution of the first partial rewriting step. As a consequence of the execution of the first partial rewriting step explained above, an original image displayed on the image display unit 3 is rewritten into an in-process image shown in FIG. 8.

Figure 14:
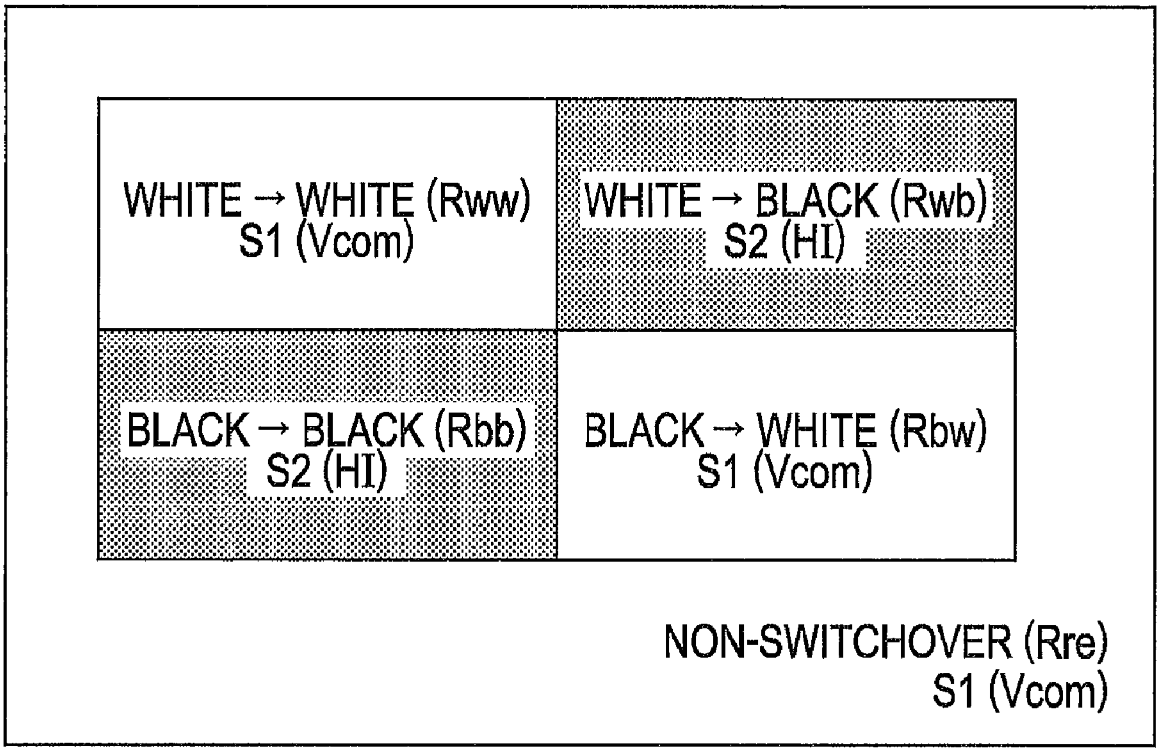
FIG. 14 is a conceptual diagram that schematically illustrates, on an area-by-area basis, an example of a driving method that is implemented in the second partial rewriting step according to the second embodiment of the invention.

FIG. 14 is a conceptual diagram that schematically illustrates, on an area-by-area basis, an example of a driving method that is implemented in the second partial rewriting step according to the second embodiment of the invention.

As shown in FIG. 14, the common voltage Vcom is supplied as the electric potential S1 to each of the plurality of pixel electrodes 21 that are provided in pixel areas corresponding to the area parts Rbw and Rww of the area section Rd as well as the area part Rre in the second partial rewriting step according to the present embodiment of the invention. Therefore, no electric potential difference arises between the pixel electrode 21 and the common electrode 22 in each of the plurality of pixels 20 that are located in the pixel areas corresponding to the area parts Rbw and Rww of the area section Rd as well as the area part Rre. Therefore, the gray scale of each of the pixels 20 does not change at these area parts Rbw, Rww, and Rre. On the other hand, the aforementioned first voltage HI is supplied as the electric potential S2 to each of the plurality of pixel electrodes 21 that are provided in pixel areas corresponding to the area parts Rwb and Rbb in the second partial rewriting step according to the present embodiment of the invention. The first electric potential HI corresponds to black display. As a result of the migration of the electrophoretic particles 82 and 83, the gray scale of the pixels 20 located in the pixel area corresponding to the area part Rwb is rewritten from white into black. The gray scale of the pixels 20 located in the pixel area corresponding to the area part Rbb is also black both before and after the execution of the second partial rewriting step. As a consequence of the execution of the second partial rewriting step explained above, the in-process image displayed on the image display unit 3 is rewritten into a final image shown in FIG. 10, that is, a rewritten image.

As explained above, the image P1 is rewritten into the image P2 through two partial rewriting steps. In the following description, the level of a voltage that is applied to the pixel electrode 21 in each of the first partial rewriting step and the second partial rewriting step according to the present embodiment of the invention is explained.

Figure 15:
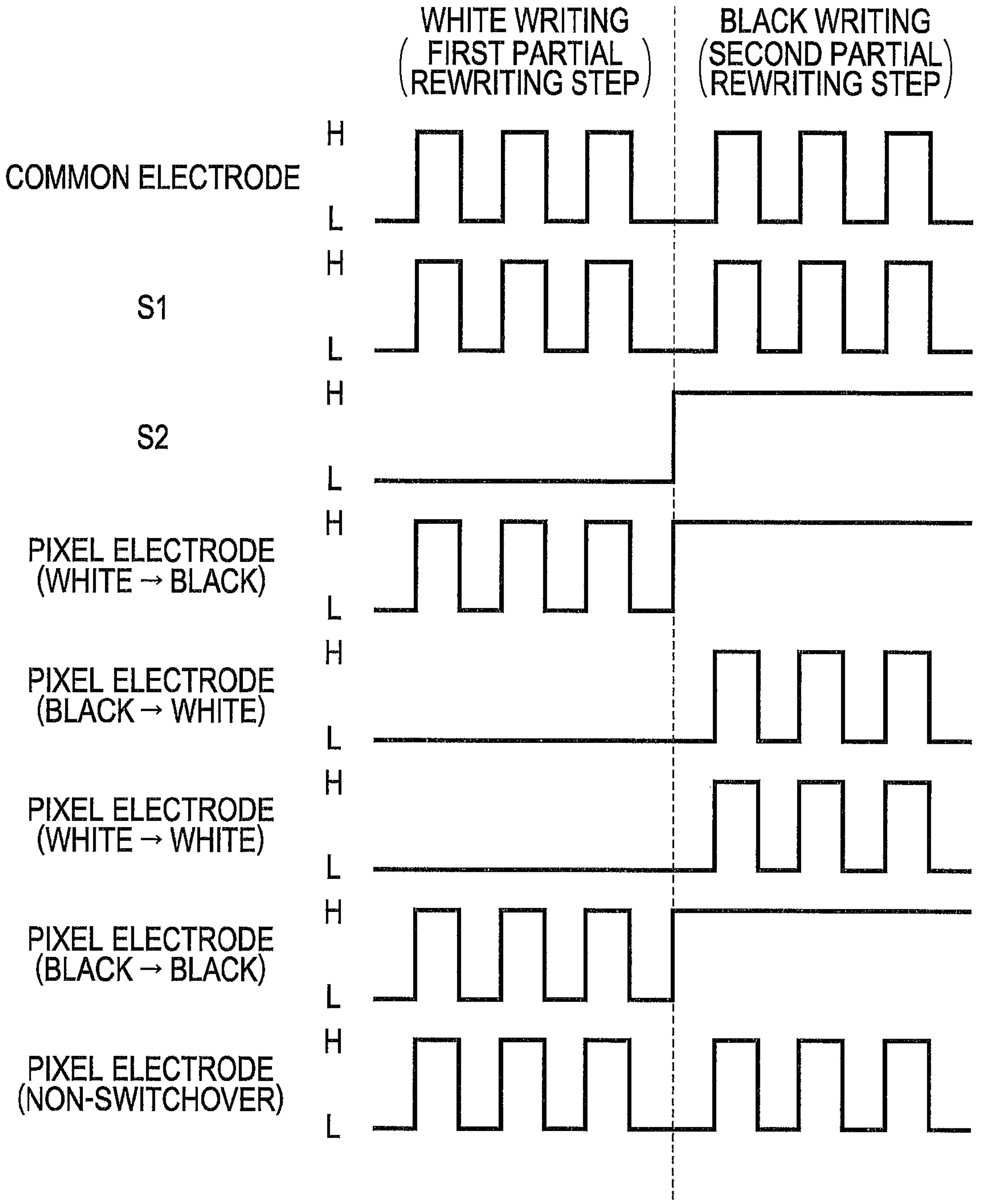
FIG. 15 is a waveform chart according to the second embodiment of the invention, which schematically illustrates an example of the level of a voltage that is supplied to pixels for each of the first partial rewriting step and the second partial rewriting step when image rewriting is performed.

FIG. 15 is a waveform chart according to the second embodiment of the invention, which schematically illustrates an example of the level of a voltage that is supplied to the pixels 20 located in pixel areas corresponding to the area parts Rwb, Rbw, Rww, Rbb, and Rre for each of the first partial rewriting step and the second partial rewriting step when image rewriting is performed. It should be noted that FIG. 15 shows a waveform obtained at the time of the writing of an image only. That is, a waveform obtained at the time of the writing of image data into the aforementioned memory circuit and the like is not illustrated therein.

As illustrated in FIG. 15, the common voltage Vcom is supplied to the common electrode 22 throughout the execution of the first partial rewriting step and the second partial rewriting step. The same electric potential as that of the common voltage Vcom is supplied as the electric potential S1. The second electric potential LO that is used for offering white display is supplied as the electric potential S2 in the first partial rewriting step, whereas the first electric potential HI that is used for offering black display is supplied as the electric potential S2 in the second partial rewriting step.

In a method for driving the electrophoretic display device 1 according to the second embodiment of the invention, a voltage is supplied to the pixel electrodes 21 in the area section Rd as follows. The common voltage Vcom, that is, the electric potential S1, is supplied to each of the plurality of pixel electrodes 21 that are provided in the pixel area corresponding to the "from-white-to-black" area part Rwb in the first partial rewriting step. Then, the first voltage HI, that is, the electric potential S2, is supplied to each of the plurality of pixel electrodes 21 that are provided in the pixel area corresponding to the white-to-black switchover area part Rwb in the second partial rewriting step. As defined earlier, the white-to-black switchover sub area Rwb is a conceptually divided part of the image display area that is rewritten from white to black. The second voltage LO, that is, the electric potential S2, is supplied to each of the plurality of pixel electrodes 21 that are provided in the pixel area corresponding to the "from-black-to-white" area part Rbw in the first partial rewriting step. Then, the common voltage Vcom, that is, the electric potential S1, is supplied to each of the plurality of pixel electrodes 21 that are provided in the pixel area corresponding to the black-to-white switchover area part Rbw in the second partial rewriting step. As defined earlier, the black-to-white switchover sub area Rbw is a conceptually divided part of the image display area that is rewritten from black to white. The supplying of a voltage to the pixel electrodes 21 corresponding to the area part Rww is performed in the same manner as the supplying of a voltage to the pixel electrodes 21 corresponding to the area part Rbw. Specifically, the second voltage LO, that is, the electric potential S2, is supplied to each of the plurality of pixel electrodes 21 that are provided in the pixel area corresponding to the "from-white-to-white" area part Rww in the first partial rewriting step. Then, the common voltage Vcom, that is, the electric potential S1, is supplied to each of the plurality of pixel electrodes 21 that are provided in the pixel area corresponding to the above-mentioned from-white-to-white area part Rww in the second partial rewriting step. As defined earlier, the above-mentioned from-white-to-white sub area Rww is a conceptually divided part of the image display area that is rewritten from white to white in the course of image rewriting. The supplying of a voltage to the pixel electrodes 21 corresponding to the area part Rbb is performed in the same manner as the supplying of a voltage to the pixel electrodes 21 corresponding to the area part Rwb. Specifically, the common voltage Vcom, that is, the electric potential S1, is supplied to each of the plurality of pixel electrodes 21 that are provided in the pixel area corresponding to the "from-black-to-black" area part Rbb in the first partial rewriting step. Then, the first voltage HI, that is, the electric potential S2, is supplied to each of the plurality of pixel electrodes 21 that are provided in the pixel area corresponding to the above-mentioned from-black-to-black area part Rbb in the second partial rewriting step. As defined earlier, the above-mentioned from-black-to-black sub area Rbb is a conceptually divided part of the image display area that is rewritten from black to black in the course of image rewriting.

As explained above, in a method for driving the electrophoretic display device 1 according to the second embodiment of the invention, the rewriting of an original display image is performed through two steps, that is, the first partial rewriting step and the second partial rewriting step, as done in the foregoing first embodiment of the invention. Through these partial rewriting steps, it is possible to rewrite the gray scale of each of pixels that are located in a pixel area corresponding to the area section Rd into a desired target gray scale without failure. It should be particularly noted that, in a method for driving the electrophoretic display device 1 according to the second embodiment of the invention, an image is written not only in the area parts Rwb and Rbw but also in the area parts Rww and Rbb. For this reason, unlike a driving method according to the first embodiment of the invention described above, a driving method according to the present embodiment of the invention makes it possible to execute image-writing operation even when the original image P1 before writing (refer to FIG. 5) is not memorized.

No electric potential difference arises between the pixel electrode 21 and the common electrode 22 in each of the plurality of pixels located in a pixel area corresponding to the area part Rre, which is outside the area section Rd. Therefore, there occurs no gray-scale change thereat. Since the pixels corresponding to the area part Rre are not driven, it is not only possible to reduce power consumption but also possible to reduce degradation in an image display unit due to the occurrence of an electric potential difference between electrodes. Moreover, it is possible to avoid the occurrence of flicker due to rewriting performed at the pixels at which their original gray scale should be retained. Furthermore, it is possible to avoid a decrease in contrast due to kickback. Furthermore, if a method for driving the electrophoretic display device 1 according to the second embodiment of the invention is adopted, it is possible to prevent any undesirable gray scale difference from arising because of the successive writing of the same gray scale into pixels located in a pixel area corresponding to the area part Rre, which is outside the area section Rd.

The method for driving the electrophoretic display device 1 according to the second embodiment of the invention explained above is advantageous when used in such an application in which rewriting is performed frequently at a certain limited area. For example, remarkable effects can be expected when the driving method according to the second embodiment of the invention is applied to use such as time display in a watch or the like, which has a predetermined image-change area.

As explained in detail above, a method for driving an electrophoretic display device according to the second embodiment of the invention achieves partial rewriting of a display image as done in a method for driving an electrophoretic display device according to the first embodiment of the invention explained earlier. By this means, it is possible to display an image with high quality while reducing power consumption and reducing degradation.

Third Embodiment

Next, a method for driving an electrophoretic display device according to a third embodiment of the invention is explained below while referring to FIGS. 16-18. The method for driving an electrophoretic display device according to the third embodiment of the invention differs from the method for driving an electrophoretic display device according to the first embodiment of the invention and the second embodiment of the invention explained above in terms of pixels at which a gray-scale change occurs. Other features of the third embodiment of the invention are substantially the same as those of the first and second embodiments of the invention. Therefore, in the following description of the method for driving an electrophoretic display device according to the third embodiment of the invention, an explanation is given with a focus on the differentiating and characteristic features thereof. Note that a detailed explanation of other features of the method for driving an electrophoretic display device according to the third embodiment of the invention may be omitted or simplified in order to avoid redundancy as long as the understanding of the unique features of this aspect of the invention is not impaired. As in the foregoing description of an electrophoretic display device driving method according to the first and second embodiments of the invention, in the following description of an electrophoretic display device driving method according to the third embodiment of the invention, it is assumed that the image P1 that is displayed on the image display unit 3 before rewriting, which is shown on the left of FIG. 5, is rewritten into the image P2 that is displayed on the image display unit 3 after rewriting, which is shown on the right thereof.

FIG. 16 is a conceptual diagram that schematically illustrates, on an area-by-area basis, an example of a driving method that is implemented in the first partial rewriting step according to the third embodiment of the invention.

As illustrated in FIG. 16, in a method for driving the electrophoretic display device 1 according to the third embodiment of the invention, the aforementioned common voltage Vcom is supplied as the aforementioned electric potential S1 to each of the plurality of pixel electrodes 21 that are provided in a pixel area corresponding to the white non-switchover area part in which a plurality of pixels that contributes to white display when the original image P1 is displayed and contributes to white display when the rewritten image P2 is displayed is located, that is, the area part Rww shown in FIG. 6, and is further supplied to each of the plurality of pixel electrodes 21 that are provided in a pixel area corresponding to the white-to-black switchover area part in which a plurality of pixels that contributes to white display when the original image P1 is displayed and contributes to black display when the rewritten image P2 is displayed is located, that is, the area part Rwb shown in FIG. 6 in the first partial rewriting step. That is, the common voltage Vcom that has been outputted from the power supply circuit 210 is supplied thereto via the first control line 94. Therefore, no electric potential difference arises between the pixel electrode 21 and the common electrode 22 in each of the plurality of pixels 20 that are located in the pixel areas corresponding to the area parts Rww and Rwb. Therefore, the gray scale of each of the pixels 20 does not change at these area parts Rww and Rwb. On the other hand, in this first partial rewriting step, the aforementioned second voltage LO is supplied as the aforementioned electric potential S2 to each of the plurality of pixel electrodes 21 that are provided in a pixel area corresponding to the "black-to-white-to-black" area part in which a plurality of pixels that contributes to black display when the original image P1 is displayed and contributes to black display when the rewritten image P2 is displayed is located, that is, the area part Rbb shown in FIG. 6, and is further supplied to each of the plurality of pixel electrodes 21 that are provided in a pixel area corresponding to the black-to-white switchover area part in which a plurality of pixels that contributes to black display when the original image P1 is displayed and contributes to white display when the rewritten image P2 is displayed is located, that is, the area part Rbw shown in FIG. 6. That is, the second voltage LO that has been outputted from the power supply circuit 210 is supplied thereto via the second control line 95. The second electric potential LO, which is, for example, 0V but not limited thereto, corresponds to white display. As a result of the migration of the electrophoretic particles 82 and 83, the gray scale of the pixels 20 located in the pixel areas corresponding to the area parts Rbb and Rbw is rewritten from black into white.

Through the execution of the first partial rewriting step, the gray scale of both of the area parts Rbb and Rbw where a plurality of pixels that contributes to black display when the original image P1 is displayed is located are rewritten from black into white. For this reason, in a method for driving the electrophoretic display device 1 according to the present embodiment of the invention, the in-process image that is displayed at the time of the completion of the first partial rewriting step is completely white, which means that it does not have any black area part.

FIG. 17 is a conceptual diagram that schematically illustrates, on an area-by-area basis, an example of a driving method that is implemented in the second partial rewriting step according to the third embodiment of the invention.

Next, in the second partial rewriting step, the common voltage Vcom is supplied as the electric potential S1 to each of the plurality of pixel electrodes 21 that are provided in pixel areas corresponding to the area parts Rww and Rbw. Therefore, no electric potential difference arises between the pixel electrode 21 and the common electrode 22 in each of the plurality of pixels 20 that are located in the pixel areas corresponding to the area parts Rww and Rbw. Therefore, the gray scale of each of the pixels 20 does not change at these area parts Rww and Rbw. On the other hand, the aforementioned first voltage HI is supplied as the electric potential S2 to each of the plurality of pixel electrodes 21 that are provided in pixel areas corresponding to the area parts Rbb and Rwb in the second partial rewriting step according to the present embodiment of the invention. The first electric potential HI, which is, for example, 15V but not limited thereto, corresponds to black display. As a result of the migration of the electrophoretic particles 82 and 83, the gray scale of the pixels 20 located in the pixel areas corresponding to the area parts Rbb and Rwb is rewritten from white into black.

As explained above, the original display image P1 shown on the left of FIG. 5 is rewritten into the image P2 shown on the right thereof through two steps, that is, the first partial rewriting step and the second partial rewriting step. In the following description, the level of a voltage that is applied to the pixel electrode 21 in each of the first partial rewriting step and the second partial rewriting step according to the present embodiment of the invention is explained.

Figure 18:
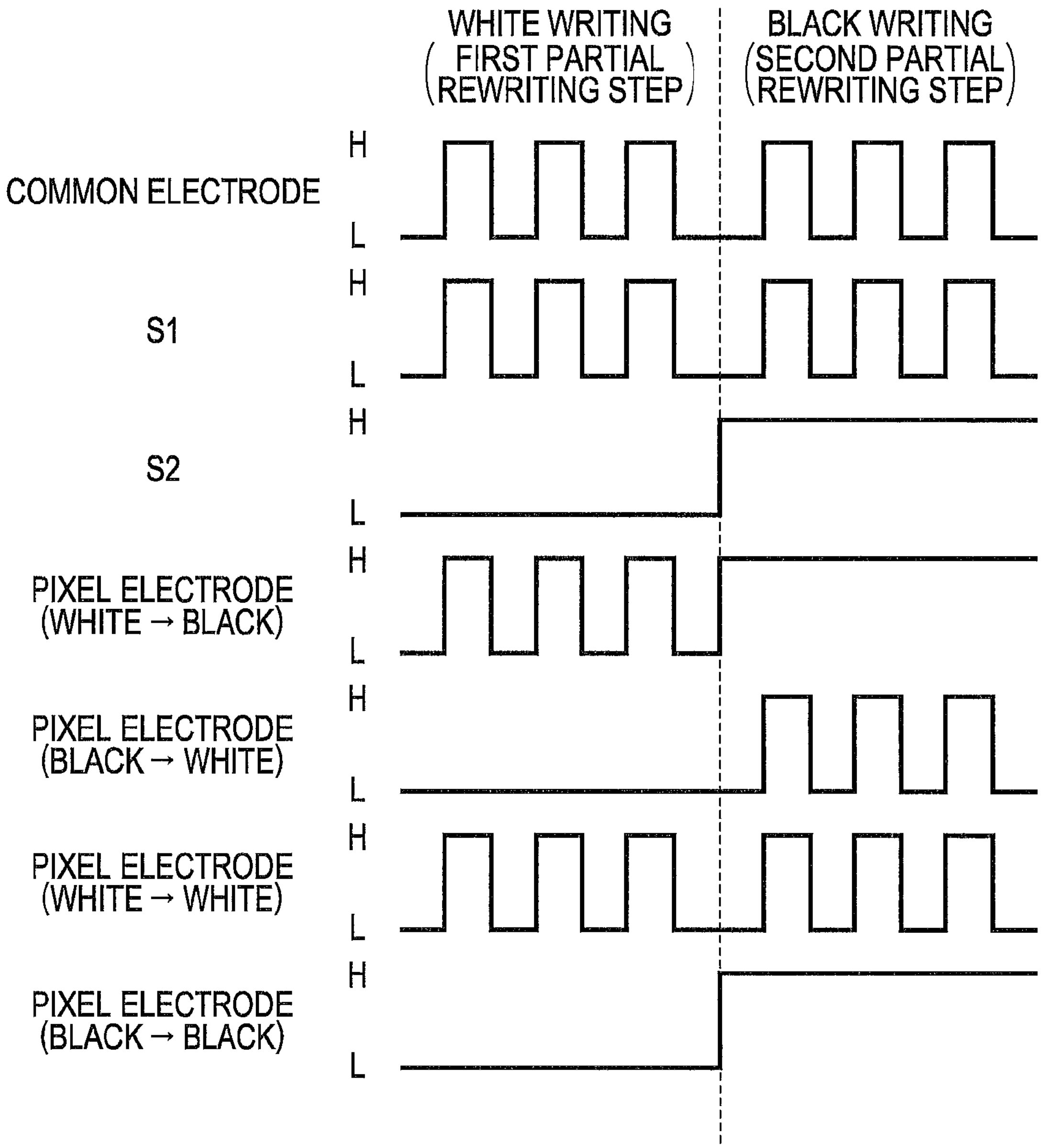
FIG. 18 is a waveform chart according to the third embodiment of the invention, which schematically illustrates an example of the level of a voltage that is supplied to pixels for each of the first partial rewriting step and the second partial rewriting step when image rewriting is performed.

FIG. 18 is a waveform chart according to the third embodiment of the invention, which schematically illustrates an example of the level of a voltage that is supplied to the pixels 20 located in pixel areas corresponding to the area parts Rwb, Rbw, Rww, and Rbb for each of the first partial rewriting step and the second partial rewriting step when image rewriting is performed. It should be noted that FIG. 18 shows a waveform obtained at the time of the writing of an image only. That is, a waveform obtained at the time of the writing of image data into the aforementioned memory circuit and the like is not illustrated therein.

As illustrated in FIG. 18, the common voltage Vcom is supplied to the common electrode 22 throughout the execution of the first partial rewriting step and the second partial rewriting step. The same electric potential as that of the common voltage Vcom is supplied as the electric potential S1. The second electric potential LO that is used for offering white display is supplied as the electric potential S2 in the first partial rewriting step, whereas the first electric potential HI that is used for offering black display is supplied as the electric potential S2 in the second partial rewriting step.

In a method for driving the electrophoretic display device 1 according to the third embodiment of the invention, a voltage is supplied to the pixel electrodes 21 in the area parts Rwb, Rbw, Rww, and Rbb as follows. The common voltage Vcom, that is, the electric potential S1, is supplied to each of the plurality of pixel electrodes 21 that are provided in the pixel area corresponding to the "from-white-to-black" area part Rwb in the first partial rewriting step. Then, the first voltage HI, that is, the electric potential S2, is supplied to each of the plurality of pixel electrodes 21 that are provided in the pixel area corresponding to the white-to-black switchover area part Rwb in the second partial rewriting step. As defined earlier, the above-mentioned from-white-to-black sub area Rwb is a conceptually divided part of the image display area that is rewritten from white to black. The second voltage LO, that is, the electric potential S2, is supplied to each of the plurality of pixel electrodes 21 that are provided in the pixel area corresponding to the "from-black-to-white" area part Rbw in the first partial rewriting step. Then, the common voltage Vcom, that is, the electric potential S1, is supplied to each of the plurality of pixel electrodes 21 that are provided in the pixel area corresponding to the black-to-white switchover area part Rbw in the second partial rewriting step. As defined earlier, the black-to-white switchover sub area Rbw is a conceptually divided part of the image display area that is rewritten from black to white. The common voltage Vcom, that is, the electric potential S1, is supplied to each of the plurality of pixel electrodes 21 that are provided in the pixel area corresponding to the white non-switchover area part Rww, which is a conceptually divided part of the image display area that retains its original gray scale of white without any switchover in the course of image rewriting, throughout the execution of the first partial rewriting step and the second partial rewriting step. The second voltage LO, that is, the electric potential S2, is supplied in the first partial rewriting step to each of the plurality of pixel electrodes 21 that are provided in the pixel area corresponding to the black-to-white-to-black area part Rbb, which is a conceptually divided part of the image display area that finally retains its original gray scale of black after a black-to-white temporary switchover followed by a white-to-black switchover in the course of image rewriting. In the second partial rewriting step, which is the white-to-black switchover process, the first voltage HI (i.e., the electric potential S2) is supplied to each of the plurality of pixel electrodes 21 that are provided in the pixel area corresponding to the black-to-white-to-black area part Rbb.

As explained above, in a method for driving the electrophoretic display device 1 according to the present embodiment of the invention, the rewriting of an original display image is performed through two steps, that is, the first partial rewriting step and the second partial rewriting step. Through these partial rewriting steps, it is possible to rewrite the gray scale of each of pixels that should be rewritten from white to black and pixels that should be rewritten from black to white into a desired target gray scale, that is, black for the first-mentioned pixels and white for the second-mentioned pixels. As for each of the plurality of pixels 20 that are located in the pixel area corresponding to the black-to-white-to-black area part Rbb, which should finally retain its original gray scale of black, the gray scale thereof is temporarily rewritten from black into white through the first partial rewriting step. However, the gray scale thereof returns to black as a result of the execution of the second partial rewriting step. On the other hand, no electric potential difference arises between the pixel electrode 21 and the common electrode 22 in each of the plurality of pixels 20 that are located in the pixel area corresponding to the white non-switchover area part Rww, which should retain its original gray scale of white. Therefore, there occurs no gray-scale change thereat. Thus, an original image that is displayed on the image display area 3 is rewritten into a desired image without failure.

It should be particularly noted that, in a method for driving the electrophoretic display device 1 according to the present embodiment of the invention, image rewriting is not performed for each of the plurality of pixels 20 that are located in the pixel area corresponding to the white non-switchover area part Rww, which should retain its original gray scale of white as explained above. For this reason, it is not only possible to reduce power consumption but also possible to reduce degradation in an image display unit due to the occurrence of an electric potential difference between electrodes. Moreover, it is possible to avoid the occurrence of flicker due to rewriting performed at the pixels located in the pixel area corresponding to the white non-switchover area part Rww at which their original gray scale should be retained. Furthermore, it is possible to avoid a decrease in contrast due to kickback. Moreover, in a method for driving the electrophoretic display device 1 according to the present embodiment of the invention, the in-process image that is displayed at the time of the completion of the first partial rewriting step is completely white, which means that it does not have any black area part. Therefore, it is possible to avoid any partially rewritten image, that is, the in-process image, from being shown during the execution of image-rewriting operation.

Furthermore, if a method for driving the electrophoretic display device 1 according to the present embodiment of the invention is adopted, it is possible to prevent any undesirable gray scale difference from arising because of the successive writing of the same gray scale into a pixel. For example, the gray scale of a certain pixel in which black is successively written immediately after black display may differ from the gray scale of another pixel in which black is written immediately after white display. In this respect, since black is not successively written into any pixel whose preceding display gray scale is black, a method for driving the electrophoretic display device 1 according to the present embodiment of the invention ensures that a gray-scale difference that is attributable to the successive writing of the same gray scale explained above does not arise.

In addition, since image-rewriting operation is performed through the first partial rewriting step and the second partial rewriting step, it is possible to make the number of times of the writing of a first gradation (e.g., gray scale but not limited thereto) equal to the number of times of the writing of a second gradation. For this reason, in comparison with a case where rewriting is performed twice or more, it is possible to reduce degradation in an electrophoretic display device that is attributable to degradation in, for example, the electrophoretic element 23, the pixel electrode 21, or the common electrode 22. Notwithstanding the above, however, if it suffices to rewrite either one of the first gradation and the second gradation only, that is, not both, for the rewriting of an original image, either the first partial rewriting step or the second partial rewriting step may be omitted.

As explained in detail above, a method for driving an electrophoretic display device according to the third embodiment of the invention achieves partial rewriting of a display image as done in a method for driving an electrophoretic display device according to the first embodiment of the invention and the second embodiment of the invention explained earlier. By this means, it is possible to display an image with high quality while reducing power consumption and reducing degradation.

Fourth Embodiment

Next, a method for driving an electrophoretic display device according to a fourth embodiment of the invention is explained below while referring to FIGS. 19-21. The method for driving an electrophoretic display device according to the fourth embodiment of the invention differs from the method for driving an electrophoretic display device according to the third embodiment of the invention explained above in that it is not the entire image display area that is set as an image-rewriting target area in the method for driving an electrophoretic display device according to the fourth embodiment of the invention. Other features of the fourth embodiment of the invention are substantially the same as those of the third embodiment of the invention. Therefore, in the following description of the method for driving an electrophoretic display device according to the fourth embodiment of the invention, an explanation is given with a focus on the characteristic features thereof that constitute differences from those of the third embodiment of the invention described above. Note that a detailed explanation of other features of the method for driving an electrophoretic display device according to the fourth embodiment of the invention may be omitted or simplified in order to avoid redundancy as long as the understanding of the unique features of this aspect of the invention is not impaired. As in the foregoing description of an electrophoretic display device driving method according to the first, second, and third embodiments of the invention, in the following description of an electrophoretic display device driving method according to the fourth embodiment of the invention, it is assumed that the image P1 that is displayed on the image display unit 3 before rewriting, which is shown on the left of FIG. 5, is rewritten into the image P2 that is displayed on the image display unit 3 after rewriting, which is shown on the right thereof.

Figure 19:
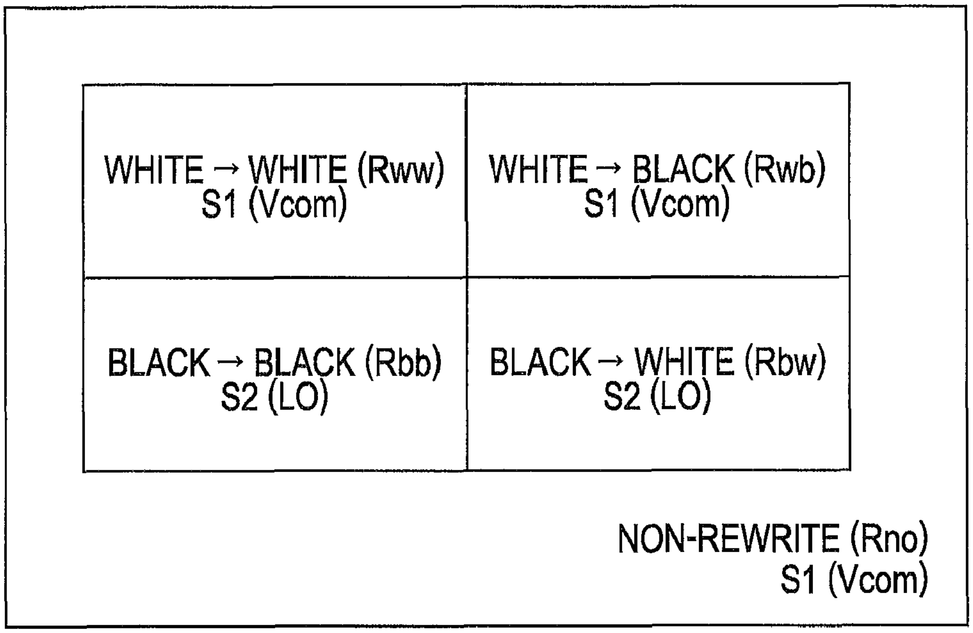
FIG. 19 is a conceptual diagram that schematically illustrates, on an area-by-area basis, an example of a driving method that is implemented in the first partial rewriting step according to a fourth embodiment of the invention.

FIG. 19 is a conceptual diagram that schematically illustrates, on an area-by-area basis, an example of a driving method that is implemented in the first partial rewriting step according to the fourth embodiment of the invention. FIG. 20 is a conceptual diagram that schematically illustrates, on an area-by-area basis, an example of a driving method that is implemented in the second partial rewriting step according to the fourth embodiment of the invention.

Figure 20:
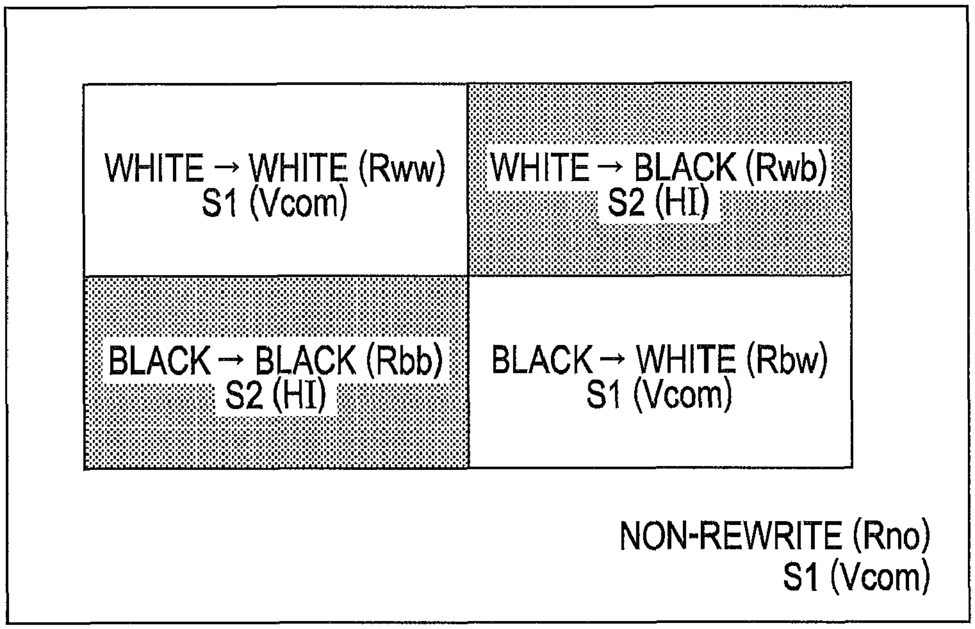
FIG. 20 is a conceptual diagram that schematically illustrates, on an area-by-area basis, an example of a driving method that is implemented in the second partial rewriting step according to the fourth embodiment of the invention.

As illustrated in FIGS. 19 and 20, in a method for driving the electrophoretic display device 1 according to the fourth embodiment of the invention, pixels located in pixel areas corresponding to the area parts Rww, Rwb, Rbb, and Rbw are subjected to control as done in a method for driving the electrophoretic display device 1 according to the third embodiment of the invention explained above. In the following description of the present embodiment of the invention, the area parts Rww, Rwb, Rbb, and Rbw may be collectively referred to as a "rewriting target area". The common voltage Vcom, that is, the electric potential S1, is supplied to each of the plurality of pixel electrodes 21 that are provided in a pixel area corresponding to an area Rno that does not include the rewriting target area. This area Rno may be hereafter referred to as a "non-rewrite area".

Figure 21:
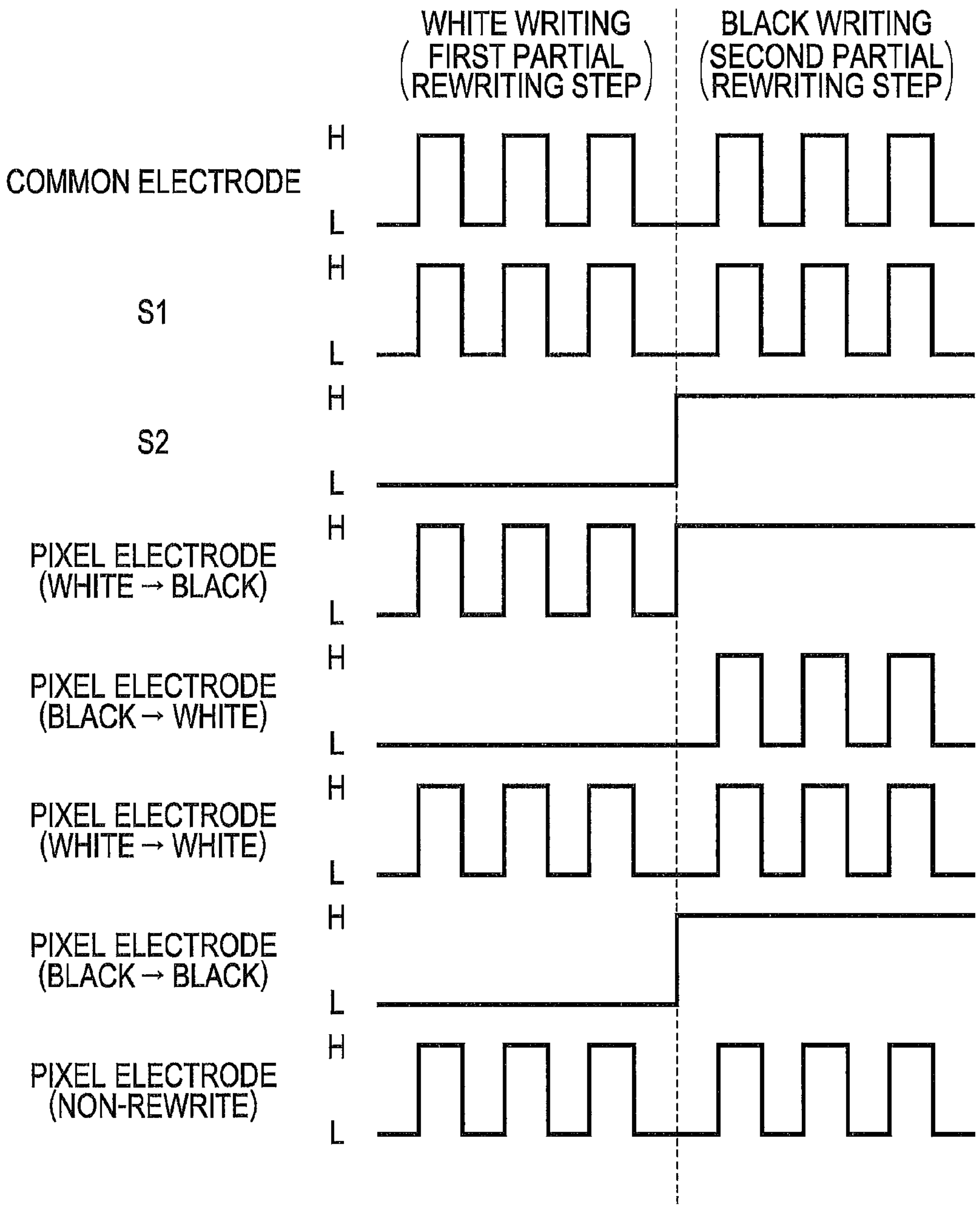
FIG. 21 is a waveform chart according to the fourth embodiment of the invention, which schematically illustrates an example of the level of a voltage that is supplied to pixels for each of the first partial rewriting step and the second partial rewriting step when image rewriting is performed.

FIG. 21 is a waveform chart according to the fourth embodiment of the invention, which schematically illustrates an example of the level of a voltage that is supplied to the pixels 20 located in pixel areas corresponding to the area parts Rwb, Rbw, Rww, Rbb, and Rno for each of the first partial rewriting step and the second partial rewriting step when image rewriting is performed. It should be noted that FIG. 21 shows a waveform obtained at the time of the writing of an image only. That is, a waveform obtained at the time of the writing of image data into the aforementioned memory circuit and the like is not illustrated therein.

As illustrated in FIG. 21, the common voltage Vcom is supplied to the common electrode 22 throughout the execution of the first partial rewriting step and the second partial rewriting step. The same electric potential as that of the common voltage Vcom is supplied as the electric potential S1. The second electric potential LO that is used for offering white display is supplied as the electric potential S2 in the first partial rewriting step, whereas the first electric potential HI that is used for offering black display is supplied as the electric potential S2 in the second partial rewriting step.

In a method for driving the electrophoretic display device 1 according to the fourth embodiment of the invention, a voltage is supplied to the pixel electrodes 21 in the rewriting target area as follows. The common voltage Vcom, that is, the electric potential S1, is supplied to each of the plurality of pixel electrodes 21 that are provided in the pixel area corresponding to the "from-white-to-black" area part Rwb in the first partial rewriting step. Then, the first voltage HI, that is, the electric potential S2, is supplied to each of the plurality of pixel electrodes 21 that are provided in the pixel area corresponding to the white-to-black switchover area part Rwb in the second partial rewriting step. As defined earlier, the above-mentioned from-white-to-black sub area Rwb is a conceptually divided part of the image display area that is rewritten from white to black. The second voltage LO, that is, the electric potential S2, is supplied to each of the plurality of pixel electrodes 21 that are provided in the pixel area corresponding to the "from-black-to-white" area part Rbw in the first partial rewriting step. Then, the common voltage Vcom, that is, the electric potential S1, is supplied to each of the plurality of pixel electrodes 21 that are provided in the pixel area corresponding to the black-to-white switchover area part Rbw in the second partial rewriting step. As defined earlier, the black-to-white switchover sub area Rbw is a conceptually divided part of the image display area that is rewritten from black to white. The common voltage Vcom, that is, the electric potential S1, is supplied to each of the plurality of pixel electrodes 21 that are provided in the pixel area corresponding to the white non-switchover area part Rww, which is a conceptually divided part of the image display area that retains its original gray scale of white without any switchover in the course of image rewriting, throughout the execution of the first partial rewriting step and the second partial rewriting step. The second voltage LO, that is, the electric potential S2, is supplied in the first partial rewriting step to each of the plurality of pixel electrodes 21 that are provided in the pixel area corresponding to the black-to-white-to-black area part Rbb, which is a conceptually divided part of the image display area that finally retains its original gray scale of black after a black-to-white temporary switchover followed by a white-to-black switchover in the course of image rewriting. In the second partial rewriting step, which is the white-to-black switchover process, the first voltage HI (i.e., the electric potential S2) is supplied to each of the plurality of pixel electrodes 21 that are provided in the pixel area corresponding to the black-to-white-to-black area part Rbb.

In a method for driving the electrophoretic display device 1 according to the fourth embodiment of the invention, as has already been described above, the common voltage Vcom, that is, the electric potential S1, is supplied to each of the plurality of pixel electrodes 21 that are provided in a pixel area corresponding to the non-rewrite area Rno. Therefore, no electric potential difference arises between the pixel electrode 21 and the common electrode 22 in each of the plurality of pixels 20 that are located in the pixel area corresponding to the non-rewrite area Rno. Therefore, the gray scale of each of the pixels 20 does not change at the non-rewrite area Rno.

The electrophoretic display device driving method according to the fourth embodiment of the invention explained above makes it possible to rewrite an original image that is displayed on the image display area 3 into a desired image without failure. In addition, it is possible to reduce power consumption because it is not necessary to perform image-rewriting operation in the non-rewrite area Rno. Moreover, since image rewriting is not performed for each of the plurality of pixels 20 that are located in the pixel areas corresponding to the white non-switchover area part Rww and the non-rewrite area Rno, it is possible to reduce degradation in an image display unit due to the occurrence of an electric potential difference between electrodes. Furthermore, it is possible to avoid the occurrence of flicker due to rewriting performed at the pixels located in the pixel areas at which their original gray scale should be retained. Furthermore, it is possible to avoid a decrease in contrast due to kickback. As is the case with the method for driving the electrophoretic display device 1 according to the second embodiment of the invention explained earlier, the method for driving the electrophoretic display device 1 according to the fourth embodiment of the invention explained herein is advantageous when used in such an application in which rewriting is performed frequently at a certain limited area.

As explained in detail above, a method for driving an electrophoretic display device according to the fourth embodiment of the invention achieves partial rewriting of a display image as done in a method for driving an electrophoretic display device according to the first, second, and third embodiments of the invention explained earlier. By this means, it is possible to display an image with high quality while reducing power consumption and reducing degradation.

Electronic Apparatus

Next, with reference to FIGS. 22 and 23, an example of various kinds of electronic apparatuses to which an electrophoretic display device according to the foregoing exemplary embodiment of the invention is applied is explained below. In the following non-limiting examples, an electrophoretic display device according to the foregoing exemplary embodiment of the invention is applied to a sheet of electronic paper and an electronic notebook.

Figure 22:
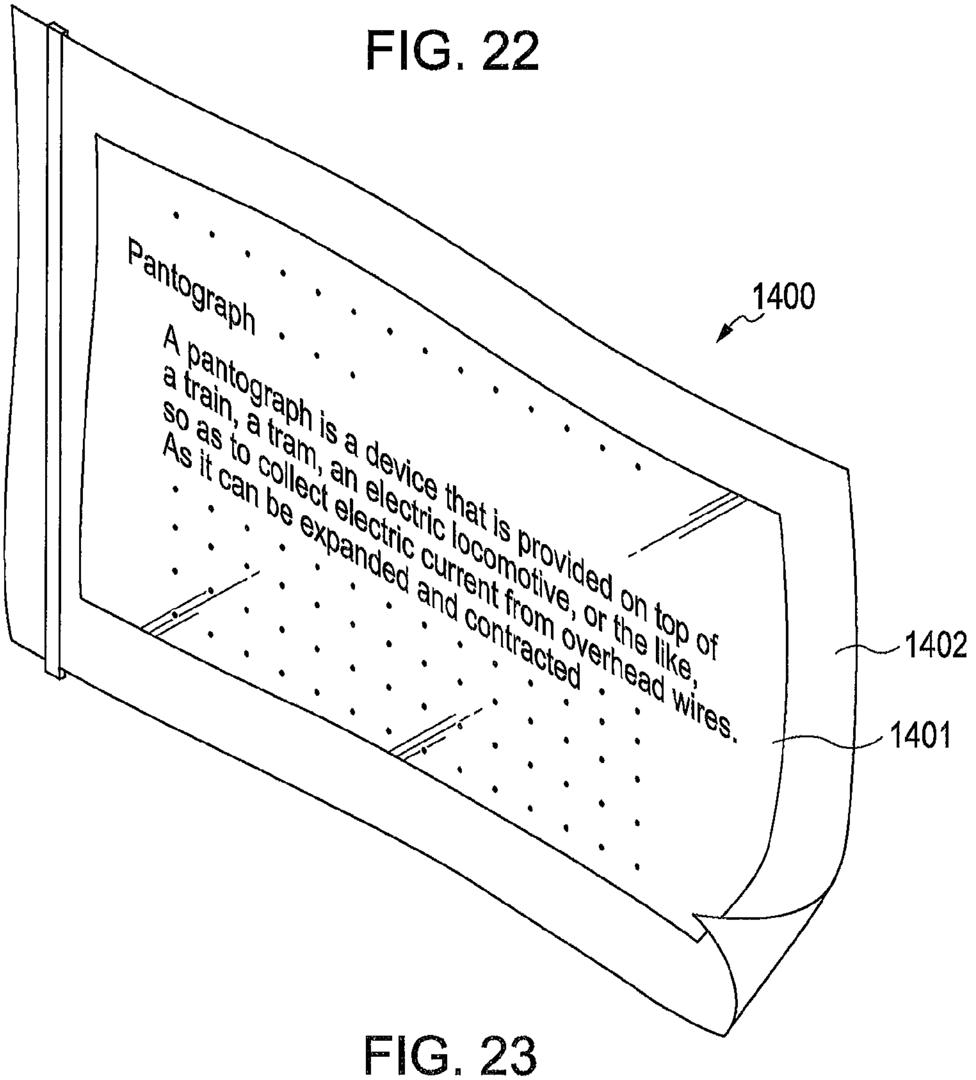
FIG. 22 is a perspective view that schematically illustrates an example of the configuration of a sheet of electronic paper, which is an example of electronic apparatuses to which an electrophoretic display device according to an aspect of the invention is applied.

FIG. 22 is a perspective view that schematically illustrates an example of the configuration of a sheet of electronic paper 1400.

As shown in FIG. 22, the electronic paper 1400 has an electrophoretic display device according to the foregoing exemplary embodiment of the invention as its display unit 1401, that is, a display area. The electronic paper 1400 has a thin body portion 1402. The thin body portion 1402 of the electronic paper 1400 is made of a sheet material that has almost the same texture and flexibility as those of conventional paper (i.e., normal non-electronic paper). An electrophoretic display device according to an exemplary embodiment of the invention is provided on the surface of the thin body portion 1402 of the electronic paper 1400.

Figure 23:
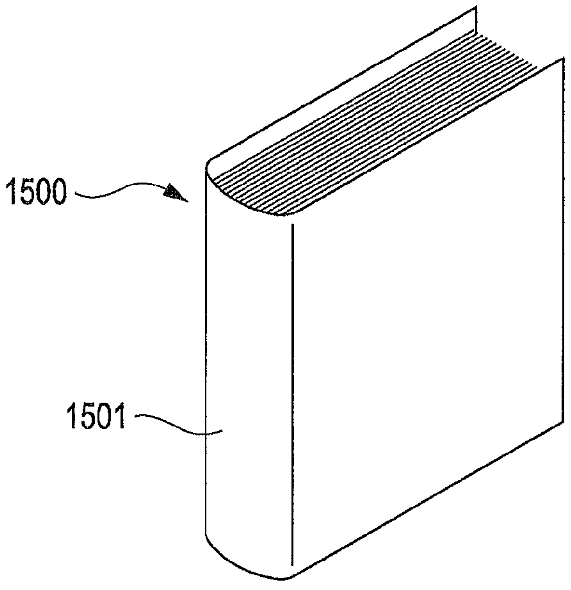
FIG. 23 is a perspective view that schematically illustrates an example of the configuration of an electronic notebook, which is an example of electronic apparatuses to which an electrophoretic display device according to an aspect of the invention is applied.

FIG. 23 is a perspective view that schematically illustrates an example of the configuration of an electronic book 1500, which is an example of an electronic apparatus according to an exemplary embodiment of the invention.

As illustrated in FIG. 23, the electronic notebook 1500 has a plurality of sheets of the electronic paper 1400 illustrated in FIG. 22. The electronic notebook 1500 is further provided with a book jacket 1501, which covers the sheets of electronic paper 1400. The book jacket 1501 is provided with a display data input unit that supplies (i.e., inputs) display data that has been sent from, for example, an external device. The display data input unit is not shown in the drawing. Having such a configuration, the electronic notebook 1500 illustrated in FIG. 23 is capable of changing and/or updating (i.e., overwriting) display content in accordance with the supplied display data without any necessity to unbind the electronic paper 1400.

Since the electronic paper 1400 and the electronic notebook 1500 described above is provided with an electrophoretic display device according to the foregoing exemplary embodiment of the invention, it is possible to display an image with high quality while reducing power consumption and reducing degradation.

In addition to the electronic paper 1400 and the electronic notebook 1500 described above, it is possible to apply an electrophoretic display device according to the foregoing exemplary embodiment of the invention to a display unit of a variety of electronic apparatuses including but not limited to a watch, a mobile phone, and a handheld audio device.

The present invention should be in no case interpreted to be limited to the specific embodiments described above. The invention may be modified, altered, changed, adapted, and/or improved within a range not departing from the gist and/or spirit of the invention apprehended by a person skilled in the art from explicit and implicit description given herein as well as recitation of appended claims. A method for driving an electrophoretic display device subjected to such modification, alteration, change, adaptation, and/or improvement, an electrophoretic display device that is driven by such a method, and an electronic apparatus that is provided with such an electrophoretic display device are also within the technical scope of the invention.

The entire disclosure of Japanese Patent Application Nos: 2008-075621, filed Mar. 24, 2008 and 2008-265421, filed Oct. 14, 2008 are expressly incorporated by reference herein.

What is claimed is:

1. A method for driving an electrophoretic display device, the electrophoretic display device including:
 a display unit having a plurality of pixels,
 each of the plurality of pixels having:
  an electrophoretic element containing a plurality of electrophoretic particles being sandwiched between a pixel electrode and a common electrode that face each other,
the driving method comprising:
 during a first partial rewriting period, when an image that is displayed on the display unit is rewritten, partially rewriting the image that is displayed on the display unit by:
  supplying a common voltage to the common electrode,
  supplying a second voltage to the pixel electrode of each of first pixels among the above-mentioned plurality of pixels, the above-mentioned each of the first pixels displaying a first gradation before the rewriting of the image and then displaying a second gradation that is different from the first gradation after the rewriting of the image, the second voltage being set so as to correspond to the second gradation, and
  supplying a voltage that is the same as the common voltage to the pixel electrode of each of pixels other than the first pixels among the above-mentioned plurality of pixels or putting the pixel electrode of each of pixels other than the first pixels among the above-mentioned plurality of pixels into a high impedance state; and
 during a second partial rewriting period, when the image that is displayed on the display unit is rewritten, partially rewriting the image that is displayed on the display unit by:
  supplying the common voltage to the common electrode,
  supplying a first voltage to the pixel electrode of each of second pixels among the above-mentioned plurality of pixels, the above-mentioned each of the second pixels displaying the second gradation before the rewriting of the image and then displaying the first gradation after the rewriting of the image, the first voltage being set so as to correspond to the first gradation, and
  supplying a voltage that is the same as the common voltage to the pixel electrode of each of pixels other than the second pixels among the above-mentioned plurality of pixels or putting the pixel electrode of each of pixels other than the second pixels among the above-mentioned plurality of pixels into a high impedance state.

2. A method for driving an electrophoretic display device, the electrophoretic display device including:

a display unit having a plurality of pixels, each of the plurality of pixels having:

an electrophoretic element containing a plurality of electrophoretic particles being sandwiched between a pixel electrode and a common electrode that face each other, the driving method comprising:

during a first partial rewriting period, when an image that is displayed in an area section that makes up a part of the display unit is rewritten, partially rewriting the image that is displayed in the area section by:

supplying a common voltage to the common electrode, supplying a second voltage to the pixel electrode of each of first pixels among pixels located in the area section, the above-mentioned each of the first pixels displaying a first gradation before the rewriting of the image and then displaying a second gradation that is different from the first gradation after the rewriting of the image and to the pixel electrode of each of second pixels among the pixels located in the area section, the above-mentioned each of the second pixels displaying the second gradation before the rewriting of the image and then displaying the second gradation after the rewriting of the image, the second voltage being set so as to correspond to the second gradation, and supplying a voltage that is the same as the common voltage to the pixel electrode of each of pixels other than the first pixels and the second pixels among the above-mentioned plurality of pixels or putting the pixel electrode of each of pixels other than the first pixels and the second pixels among the above-mentioned plurality of pixels into a high impedance state; and during a second partial rewriting period, when the image that is displayed in the area section that makes up a part of the display unit is rewritten, partially rewriting the image that is displayed in the area section by:

supplying the common voltage to the common electrode, supplying a first voltage to the pixel electrode of each of third pixels among the pixels located in the area section, the above-mentioned each of the third pixels displaying the second gradation before the rewriting of the image and then displaying the first gradation after the rewriting of the image and to the pixel electrode of each of fourth pixels among the pixels located in the area section, the above-mentioned each of the fourth pixels displaying the first gradation before the rewriting of the image and then displaying the first gradation after the rewriting of the image, the first voltage being set so as to correspond to the first gradation, and supplying a voltage that is the same as the common voltage to the pixel electrode of each of pixels other than the third pixels and the fourth pixels among the above-mentioned plurality of pixels or putting the pixel electrode of each of pixels other than the third pixels and the fourth pixels among the above-mentioned plurality of pixels into a high impedance state.

3. A method for driving an electrophoretic display device, the electrophoretic display device including:

a display unit having a plurality of pixels, each of the plurality of pixels having:

an electrophoretic element containing a plurality of electrophoretic particles being sandwiched between a pixel electrode and a common electrode that face each other, the driving method comprising:

during a first partial rewriting period, when an image that is displayed in a rewrite area that makes up at least a part of the display unit is rewritten, partially rewriting the image that is displayed on the display unit by:

supplying a common voltage to the common electrode, supplying a second voltage to the pixel electrode of each of first pixels among pixels located in the rewrite area, the above-mentioned each of the first pixels displaying a first gradation before the rewriting of the image, the second voltage being set so as to correspond to a second gradation that is different from the first gradation, and supplying a voltage that is the same as the common voltage to the pixel electrode of each of pixels other than the first pixels among the pixels located in the rewrite area or putting the pixel electrode of each of pixels other than the first pixels among the pixels located in the rewrite area into a high impedance state; and during a second partial rewriting period, when the image that is displayed in the rewrite area that makes up at least a part of the display unit is rewritten, partially rewriting the image that is displayed on the display unit by:

supplying the common voltage to the common electrode, supplying a first voltage to the pixel electrode of each of second pixels among the pixels located in the rewrite area, the above-mentioned each of the second pixels displaying the first gradation after the rewriting of the image, the first voltage being set so as to correspond to the first gradation, and supplying a voltage that is the same as the common voltage to the pixel electrode of each of pixels other than the second pixels among the pixels located in the rewrite area or putting the pixel electrode of each of pixels other than the second pixels among the pixels located in the rewrite area into a high impedance state.

4. The method for driving an electrophoretic display device according to claim 3, wherein, throughout the first partial rewriting period and the second partial rewriting period, a voltage that is the same as the common voltage is supplied to the pixel electrode of each of pixels that are located in a non-rewrite area of the display unit, which does not include the rewrite area of the display unit, or the pixel electrode of each of pixels that are located in the non-rewrite area of the display unit is put into a high impedance state.

5. An electrophoretic display device that is driven by the electrophoretic display device driving method according to claim 1.

6. An electronic apparatus that is provided with the electrophoretic display device according to claim 5.

* * * * *